US010982163B2

(12) United States Patent
Landon et al.

(10) Patent No.: US 10,982,163 B2
(45) Date of Patent: Apr. 20, 2021

(54) MINERAL ADDITIVE BLEND COMPOSITIONS AND METHODS OF USE THEREOF

(71) Applicant: Imerys USA, Inc., Roswell, GA (US)

(72) Inventors: Thomas Landon, Marietta, GA (US); James David Osby, Dallas, GA (US); Christian Ravagnani, Limoges (FR); Murielle Perronnet, Limoges (FR)

(73) Assignee: Imerys USA, Inc., Roswell, GA (US)

( * ) Notice: Subject to any disclaimer, the term of this patent is extended or adjusted under 35 U.S.C. 154(b) by 167 days.

(21) Appl. No.: 14/367,748

(22) PCT Filed: Dec. 21, 2012

(86) PCT No.: PCT/EP2012/076838
§ 371 (c)(1),
(2) Date: Jun. 20, 2014

(87) PCT Pub. No.: WO2013/093097
PCT Pub. Date: Jun. 27, 2013

(65) Prior Publication Data
US 2015/0122161 A1    May 7, 2015

Related U.S. Application Data

(60) Provisional application No. 61/594,104, filed on Feb. 2, 2012.

(30) Foreign Application Priority Data

Dec. 21, 2011 (EP) .................................. 11290589

(51) Int. Cl.
| C10L 9/02 | (2006.01) |
| C10L 9/10 | (2006.01) |
| C10L 10/04 | (2006.01) |
| C10L 10/06 | (2006.01) |
| F23J 7/00 | (2006.01) |
| C10L 10/02 | (2006.01) |

(52) U.S. Cl.
CPC ................. *C10L 10/04* (2013.01); *C10L 9/10* (2013.01); *C10L 10/02* (2013.01); *C10L 10/06* (2013.01); *F23J 7/00* (2013.01); *C10L 2200/029* (2013.01); *C10L 2200/0209* (2013.01); *C10L 2200/0213* (2013.01); *C10L 2200/0218* (2013.01); *C10L 2200/0222* (2013.01); *C10L 2200/0268* (2013.01); *C10L 2230/02* (2013.01); *C10L 2250/06* (2013.01); *C10L 2270/04* (2013.01); *C10L 2290/28* (2013.01); *F23G 2201/701* (2013.01); *F23K 2201/505* (2013.01); *F23K 2300/103* (2020.05); *F23K 2400/10* (2020.05); *Y02E 50/10* (2013.01); *Y02E 50/30* (2013.01)

(58) Field of Classification Search
CPC .......... C10L 9/02; C10L 9/10; C10L 2300/20; C10L 2300/30
See application file for complete search history.

(56) References Cited

U.S. PATENT DOCUMENTS

| 3,332,755 | A | * | 7/1967 | Kukin | ....................... C10L 9/10 44/603 |
| 9,416,967 | B2 | | 8/2016 | Comrie | |
| 2003/0109047 | A1 | | 6/2003 | Valentine | |
| 2006/0210463 | A1 | | 9/2006 | Comrie | |
| 2008/0171297 | A1 | | 7/2008 | Reynolds et al. | |
| 2009/0205546 | A1 | | 8/2009 | Kluko | |
| 2010/0101464 | A1 | * | 4/2010 | Leach | ..................... C01B 33/40 110/345 |
| 2010/0203461 | A1 | | 8/2010 | Maly et al. | |

FOREIGN PATENT DOCUMENTS

| CN | 1038831 A | 1/1990 | |
| CN | 101 760 282 A | 6/2010 | |
| DE | 34 43 722 A1 | 6/1986 | |
| EP | 0377616 A1 * | 7/1990 | ............... C10L 9/02 |
| GB | 896796 A | 5/1962 | |
| GB | 2 117 397 A | 10/1983 | |
| GB | 2117397 A | 10/1983 | |
| GB | 2117397 A * | 10/1983 | ............... C10L 9/10 |
| JP | 58 059288 | 4/1983 | |
| JP | H02503925 | 11/1990 | |
| JP | 2005508466 A | 3/2005 | |
| JP | 2005307117 A | 11/2005 | |
| JP | 2008504427 | 2/2008 | |
| JP | 2010059297 A | 3/2008 | |
| JP | 2008533432 A | 8/2008 | |
| WO | WO 8810291 | 12/1988 | |
| WO | WO 03039737 A1 | 5/2003 | |
| WO | WO 2006/006978 A1 | 1/2006 | |
| WO | WO 2006006978 | 1/2006 | |
| WO | WO 2013/093097 A1 | 6/2013 | |

OTHER PUBLICATIONS

Office Action dated Nov. 18, 2015, in corresponding Chinese Application No. 201280069859.7.
International Search Report dated Jun. 10, 2013, for International Application No. PCT/EP2012/076838.

* cited by examiner

*Primary Examiner* — Ellen M McAvoy
*Assistant Examiner* — Ming Cheung Po
(74) *Attorney, Agent, or Firm* — Finnegan, Henderson, Farabow, Garrett & Dunner, LLP

(57) ABSTRACT

Mineral additive blend compositions and a method for operating a furnace are provided in order to avoid combustion problems such as agglomeration, deposition, corrosion and reducing emissions. A method for operating a furnace, such as a fluidized-bed reactor, pulverized-fuel combustor, and grate combustor, includes introducing fuel and a mineral additive blend including a clay and a functional mineral into the furnace.

11 Claims, No Drawings

MINERAL ADDITIVE BLEND COMPOSITIONS AND METHODS OF USE THEREOF

CLAIM FOR PRIORITY

This application is a U.S. national phase entry under 35 U.S.C. § 371 from PCT International Application PCT/EP2012/076838, filed Dec. 21, 2012, which claims the benefit of priority of European Patent Application No. 11290589.8, filed Dec. 21, 2011, and U.S. Provisional Application No. 61/594,104, filed Feb. 2, 2012, the subject matter of all of which is incorporated herein by reference.

TECHNICAL FIELD

The present disclosure relates to mineral additive blend compositions and methods for operating furnaces, and more particularly, to methods for operating furnaces such as fluidized-bed reactors, pulverized-fuel combustors or grate combustors by introduction of mineral blends into the furnace with the aim to avoid combustion problems such as slagging, agglomeration, deposition, corrosion (e.g., fouling) and reducing emissions.

BACKGROUND

Combustion processes may be used in power plant furnaces to generate heat for operating a boiler or steam generator, which generates electric power. The fuel used for such processes may include coal, petroleum coke, biofuel derived from biomass and/or solid wastes. The fuel may include inorganic volatiles, such as alkalis, alkaline earths, chlorine, fluorine, sulfur and metals.

Fossil fuel fired thermal power plants, such as coal burning facilities used by electrical utilities operate by combusting fuel in a furnace. Heat from the furnace is then used to boil water for steam to provide heat, or to turn turbines that eventually result in the production of electricity. In a typical fossil fuel fired power plant, coal is fed into the furnace and burned in the presence of oxygen at a combustion temperature ranging from about 850° C. to about 1700° C. The combustion gases (flue gas) contain carbon dioxide, nitrogen oxides, and may contain other various undesirable inorganic volatile components including alkali, alkaline earths, sulfur, chlorine, fluorine and metals such as, iron, zinc, antimonium, vanadium, arsenic, cadmium, barium, lead, nickel, chromium, cobalt and mercury. In addition, the combustion gases also typically include entrained ash which may necessitate the use of particulate removal systems and scrubbers.

In order to increase efficiency, the hot combustion gases are typically also passed through a heat exchanger to cool the gases to on the order of about 150° C. before being emitted from a stack. In atypical heat exchanger, the hot combustion gases are passed through a bundle of tubes containing a heat transfer fluid (typically water) which remove a portion of the heat from the gases. The heat exchanger tubes can be cool enough to allow for the deposition of alkali salts, alkali and alkaline earth sulphates, and chlorides such as iron chloride from the combustion gases followed by deposition of silica-rich ash particles, which can result in fouling of the heat exchanger tubes.

Some power plants may include systems that operate using, for example, a process sometimes referred to as a "fluidized-bed combustion" process. One example of such a process is a circulating fluidized-bed combustion process, which may be used for electric power generation. Some examples of circulating fluidized-bed reactors may include gasifiers, combustors, and steam generators, and typically, circulating fluidized-bed reactors have an upright furnace or boiler.

During operation, fuel, for example, particulate fuel, is introduced into a lower part of a furnace, and primary and secondary gases, for example, air, may be supplied through a bottom and/or sidewalls of the furnace. Combustion of the fuel takes place in a bed of fuel particles and other solid particles, such as, for example, calcium carbonate, which may be included for sulfur dioxide capture, and/or inert material. For example, the fluidized-bed reactor (i.e., furnace) may be configured to suspend the bed of fuel particles and other materials on upward-blowing jets of the primary and/or secondary gases during the combustion process. The upward-blowing jets facilitate mixing of the fluid particles and other materials, which serves to improve combustion by, for example, reducing undesirable emissions and increasing combustion and heat transfer efficiency.

Some power plants may include systems that operate using pulverized-fuel combustion, in which fuels are injected in the combustion chamber as fine powder. In pulverized-fuel combustion a higher temperature profile in the combustion chamber is obtained compared to other combustion technologies. The fine particles are injected through burners in the lower part of the combustion chamber together with gases, for example, air, and due to the fine fuel particle size and the high oxygen concentration a high temperature flame is produced.

Some power plants may include systems operating a grate furnace, with a stationary or movable grate (traveling, vibrating, oscillating, rotary, etc). The fuels may be introduced in the combustion chamber either continuously or intermittently where they undergo combustion on a supporting grate. Air may be supplied to the combustion chamber from underneath and from the sides of the grate to promote an efficient combustion. Some power plants may include gasifiers that apply the gasification process. Gasification can be used to produce clean gas fuel from less pure solid fuels or wastes. In the gasification process, a fuel is heated to temperatures of about 400 to 900° C., or even higher. At these temperatures complex organic molecules are broken into lower molecular weight chains.

Exhaust gas and/or solid particles entrained in the bed or in the flue gas may leave the furnace via an exhaust port in, for example, an upper part of the furnace and may be passed to a particle separator. In the particle separator, most or substantially all of the solid particles may be separated from the exhaust gas. Typically, one or more cyclones, which use tangential forces to separate particles from exhaust gas, are coupled with the furnace. During normal operation, cyclones may be capable of separating about 99.9% of the particles from the exhaust gas.

The exhaust gas and any remaining solid particles, or fly ash, may then be passed through additional processing units before ultimately being released into the atmosphere. For example, in an atmospheric circulating fluidized-bed system, the exhaust gas flows through a boiler and past its boiler tubes containing a supply of water, providing heat to convert the water to steam. The steam may then be used to drive a steam turbine, generating electricity. The exhaust gas may be passed through a heat exchanger to recover at least a portion of the heat generated during the combustion process, and the exhaust gas may be passed through environmental processing units to reduce levels of undesirable emissions, such as pollutants, for example, nitrogen oxides ("NOx"), sulfur oxides ("SOx"), and/or particulate matter ("PM").

Combustion of the fuel particles and/or heating of other materials (e.g., calcium carbonate) may result in heating of alkali-containing materials, such that alkali compounds contained therein are released. The released alkali compounds may react with ash or other inorganic components present in the fuel, such as, for example, sulfur, chlorine, and/or silica, which may result in undesirable deposits, ash accumulation, and/or corrosion occurring on exposed surface areas of the combustor components, for example, on furnace walls and/or boiler tubes. Such deposits and corrosion may lead to less efficient operation and/or lost production due to increased maintenance-related down time. Without being limited by theory, the alkali compounds may be released in a liquid or vapor form, which may be entrained in the exhaust gas. The alkali compounds may cause ash particles to stick together, leading to an undesirable ash accumulation (e.g., on boiler tubes) and fouling of the reactor system surfaces. Without being limited by theory, the alkali components combined with other inorganic components of the ash may form a eutectic mixture that form crystalline/amorphous deposits on the reactor surfaces.

As a result, it may be desirable to remove at least a portion of the alkali compounds and other undesirable inorganic volatiles, such as sulfur, chlorine, fluorine and metals, from the furnace before they react with the ash and/or other inorganic components, for example, to reduce or prevent undesirable deposits and/or corrosion.

Additionally, it may be desirable to increase the refractoriness of the ash formed, increasing its crystallization ability, crystalline fraction and its viscosity and, consequently, rendering ash less sticky and less prone to undergo deposition and densification on the exposed surfaces of the combustor components.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

According to a first aspect, there is provided a method for operating a combustor, the method comprising: introducing fuel into a furnace configured to combust the fuel; introducing a mineral additive blend comprising (i) an aluminosilicate and/or aluminum containing compound and (ii) a functional mineral into the furnace; and heating at least a portion of the fuel and mineral additive blend; wherein the functional mineral is selected from one or more of a magnesium containing mineral and a calcium containing mineral.

In a further aspect, there is provided a method for operating a combustor, the method comprising: introducing fuel into a furnace configured to combust the fuel; introducing a mineral additive blend into the furnace comprising or consisting essentially of kaolin and bentonite and/or smectite, or kaolin and bauxitic kaolin and heating at least a portion of the fuel and mineral additive blend.

In a further aspect, there is provided a method for operating a combustor, the method comprising: introducing fuel into a furnace configured to combust the fuel; introducing a mineral additive blend comprising (i) an aluminosilicate and/or aluminium containing compound and (ii) a functional mineral into the furnace; and heating at least a portion of the fuel and mineral additive blend; wherein the alumino silicate comprises or is a clay for example kaolin and the functional mineral comprises or is a high surface area mineral or a refractory mineral.

In a further aspect, there is provided a method for operating a combustor, the method comprising: introducing fuel into a furnace configured to combust the fuel; introducing a mineral additive blend into the furnace comprising or consisting essentially of kaolin and bentonite and/or smectite and heating at least a portion of the fuel and additive blend.

According to a second aspect, there is provided a method for reducing slagging and/or agglomerization during operation of a combustor, the method comprising: introducing fuel into a furnace configured to combust the fuel; introducing a mineral additive into the furnace; and heating at least a portion of the fuel and mineral blend; wherein an elemental molar ratio (Si K+Na+P):(Ca+Mg+Al) in the furnace is no greater than about 1.5 or no greater than about 1.75.

According to a third aspect, there is provided mineral additive blend for use in controlling alkali-rich and silicate-rich deposits in a furnace or boiler, or for use in the method of the first and second aspects of the present invention, comprising: 0.1-99% (or 0.1-99.9%) by weight of an aluminosilicate and/or aluminum containing compound; and 0.1-99.9% by weight of a functional mineral selected from one or more of a magnesium containing mineral and a calcium containing mineral.

According to a fourth aspect, there is provided a fuel mixture for a combustor, said fuel mixture comprising from about 0.1 or 1-20% by weight of a mineral additive blend according to the third aspect of the present invention, with the balance fuel and other optional additives.

Other aspects of the disclosure follow below.

One aspect of the disclosure relates to a method for operating a combustor, the method comprising: introducing fuel into a furnace configured to combust the fuel; introducing a mineral additive blend comprising a clay and a functional mineral into the furnace; and heating at least a portion of the fuel and mineral blend, such that at least a portion of the clay is at least partially calcined and the at least partially calcined clay and functional mineral adsorbs at least a portion of alkali present in the furnace.

In one aspect, the fuel includes an undesirable contaminant and said functional mineral (and optionally the clay) acts as a sorbent to bind said contaminant. In another aspect, the contaminant can be inorganic volatile species, like, sulfur, chlorine, fluorine and a metal compound, such as for example a vanadium compound, an iron compound, a zinc compound, an antimonium compound, an arsenic compound, a cadmium compound, a barium compound, a lead compound, a nickel compound, a chromium compound, a cobalt compound, a selenium compound or a mercury compound. In another aspect, the functional mineral can include a magnesium containing mineral, such as for example talc, magnesium oxide, magnesium hydroxide (or brucite), dolomite, magnesium carbonate (e.g., magnesite), hydro-magnesite, vermiculite, phlogopite, clinochlore, sepiolite, attapulgite or palygorskite and/or smectite (e.g., montmorillonite or beidellite). In yet another aspect, the functional mineral can include a manganese containing mineral, such as for example pyrolusite, braunite, psilomelane, and/or rhodochrosite.

In another aspect, the functional mineral can act to increase the refractoriness of the fuel ash and/or the clay. In one aspect, the functional mineral includes a metal oxide, such as for example an aluminum oxide. In another aspect, the aluminum oxide can be included as a mineral such as bauxite, gibbsite, nordstrandite, doyleite, bayerite, boehmite, diaspore and/or bauxitic kaolin. In another aspect, the metal oxide can include a titanium oxide, such as for example rutile, anatase, ilmenite, leucoxene, and/or brookite. In yet another aspect, the metal oxide can include a zirconium oxide. In yet another aspect, the metal oxide can include an aluminosilicate, such as for example andalusite, kyanite, sillimanite, hydro-topaz, mullite, pyrophyllite, dombassite, and/or halloysite.

In another aspect, the fuel combusts to form an undesirable combustion product and the functional mineral acts as catalyst to convert the undesirable combustion product to a less undesirable compound. In one aspect, the undesirable combustion product includes a nitrogen oxide. In another aspect, the functional mineral includes a titanium oxide, such as for example rutile anatase, ilmenite, leucoxene, and/or brookite.

In another aspect, the functional mineral acts to increase surface area of the clay (this may improve the adsorption efficiency of inorganic compound volatiles by increasing the number of effective adsorption sites). In one aspect, the surface area increasing functional mineral includes a smectite, such as bentonite. In another aspect, the surface area increasing functional mineral includes halloysite. In another aspect, the surface area increasing functional mineral includes bauxite. In another aspect, the surface area increasing functional mineral includes diatomite. In another aspect, the surface area increasing functional mineral includes pyrophyllite, talc, sepiolite, or palygorskite. In another aspect, the surface area increasing functional material has a surface area of at least about 25 $m^2/g$.

In yet another aspect, the clay can include kaolin. In another aspect, the clay includes a ball clay. In yet another aspect, the clay can include overburden material or process waste from a kaolin, clay or any aluminosilicate mining operation. In yet another aspect, the clay can include blends kaolin and or ball clay. In other aspects the clay can comprise or consist essentially of bauxitic kaolin and/or smectitic bentonite and/or bentonite.

In one aspect, the clay can be a hydrous clay. In another aspect, the clay can be a calcined clay. The calcined clay may contain metakaolin. In yet another aspect, the clay has a moisture content ranging from about 1% by weight or from about 5% by weight to about 15% by weight, e.g., from about 8% by weight to about 12% by weight, or even a higher moisture content. In another aspect, the clay includes a lump clay. In yet another aspect, the clay can include clay that has been at least one of shredded and crushed. In another aspect the clay can be a non-beneficiated clay. In another aspect, the clay includes a hydrous clay having a BET surface area of at least about 5 $m^2/g$ or of at least about 9 $m^2/g$, such as for example at least about 15 $m^2/g$, for example about 3 $m^2/g$ to about 200 $m^2/g$ or about 5 $m^2/g$ to about 150 $m^2/g$. In another aspect, the clay can include a hydrous clay derived from a crude clay having a moisture content of at least about 15%.

In another aspect, a slurry may be prepared using blends of the clay and the functional minerals.

In another aspect, the clay includes hydrous clay agglomerates having a size of not more than about 3 inches. In another aspect, the clay includes hydrous clay agglomerates have a size of not more than about 2 inches. In another aspect, the clay includes hydrous clay agglomerates have a size of not more than about 1 inch.

In another aspect, the method for combusting fuel can include an optional step of introducing calcium carbonate and/or the clay and the functional mineral blends into the furnace. In another aspect, the furnace can include a circulating fluidized bed, a grate combustor and a pulverized-fuel combustor. In another aspect, the method for combusting fuel includes combining at least a portion of the fuel, the clay, and the functional mineral with one another before introducing the portion of the fuel into the furnace.

In another aspect, the heating step results in calcining at least a portion of the clay, and the method further comprises: adsorbing at least a portion of alkali and metal compounds or the volatile inorganic compounds in the furnace via the calcined clay and functional minerals; and removing at least a portion of the calcined clay and functional minerals and adsorbed alkali and metal compounds or the volatile inorganic compounds from the furnace.

In another aspect, the fuel can include coal, petroleum coke, solid waste or biofuel, or a combination of any of the foregoing. In another aspect, the fuel can include biomass pellets or granules, as are sometimes used in biomass combustion applications (e.g., US20080171297A1 to Reynolds et al., US20090205546 to Kluko, etc.).

Another aspect of the disclosure relates to a composition for use in controlling alkali-rich or silicate-rich deposits in a furnace or boiler comprising: 5-99.9% by weight of a clay; and 0.1-95% by weight of a functional mineral selected from a magnesium containing mineral, a manganese containing mineral, a titanium dioxide, a zirconium oxide, a bauxitic mineral, a diatomaceous earth, an aluminosilicate mineral or a blend thereof. Another aspect of the disclosure relates to compositions of mineral blends for use in controlling slagging and bed agglomeration, alkali-rich or silicate-rich deposits and corrosion in a furnace or boiler and undesirable flue gas emissions, such as, fine particulate matter (<1 µm), heavy metals and metal compounds, alkali volatiles, SOx, NOx and Cl, comprising: 0.1-99.9% by weight of a clay; and 0.1-99.9% by weight of a functional mineral selected from a magnesium containing mineral, a manganese containing mineral, a titanium dioxide, a zirconium oxide, a bauxitic mineral, a diatomaceous earth, an aluminosilicate mineral or a blend thereof.

In one aspect, the functional mineral comprises a magnesium containing mineral. In another aspect, the magnesium containing mineral can include a talc, magnesium oxide, magnesium hydroxide, dolomite, magnesite, hydromagnesite, vermiculite, phlogopite, clinochlore, sepiolite, attapulgite or palygorskite and/or smectite (montmorillonite or beidellite). In yet another aspect, the functional mineral can include a manganese containing mineral, such as for example pyrolusite, braunite, psilomelane, and/or rhodochrosite. In one aspect, the functional mineral comprises a calcium containing mineral. In another aspect, the calcium containing mineral can include a calcium oxide, calcium hydroxide, dolomite, calcium carbonate, limestone, marble, chalk, aragonitic sand, sea shells, or coral and cement kiln dust, calcareous marl or marl or clayey marl. Calcareous marl contains about 5% to 35% of clay, marl contains about 35% to 65% of clay, clayey marl contains about 65% to 95% of clay.

In another aspect, the functional mineral includes a metal oxide, such as for example an aluminum oxide. In another aspect, the aluminum oxide can be included as a mineral such as bauxite, gibbsite nordstrandite, doyleite, bayerite, boehmite, diaspore and/or bauxitic kaolin. In another aspect, the metal oxide can include a titanium oxide, such as for example rutile, anatase, ilmenite, leucoxene, and/or brookite. In yet another aspect, the metal oxide can include a zirconium oxide. In yet another aspect, the metal oxide can include an aluminosilicate, such as for example andalusite, kyanite, sillimanite, hydro-topaz, mullite, pyrophyllite, dombassite and/or halloysite. In another aspect, the functional mineral includes a titanium oxide, such as for example rutile, anatase, ilmenite, leucoxene, and/or brookite.

In another aspect, the functional mineral acts to increase surface area of the clay. In one aspect, the surface area increasing functional mineral includes a smectite, such as bentonite. In another aspect, the surface area increasing functional mineral includes halloysite. In another aspect, the surface area increasing functional mineral includes aluminum oxide, which can be included as a mineral such as bauxite, gibbsite, nordstrandite, doyleite, bayerite, boehmite, diaspore, bauxitic kaolin. In another aspect, the surface area increasing functional mineral includes diatomite. In another aspect, the surface area increasing functional mineral includes pyrophyllite, talc, sepiolite, or palygorskite. In another aspect, the surface area increasing functional material has a surface area of at least about 25 m$^2$/g.

In yet another aspect, the clay can include kaolin. In another aspect, the clay includes a ball clay. In yet another aspect, the clay can include overburden material or process waste from a kaolin or clay or any aluminosilicate mining operation. In yet another aspect, the clay can include bauxitic kaolin. In yet another aspect, the clay can include smectitic bentonite. In yet another aspect, the clay can include blends of kaolin and or ball clay and/or bentonite and/or bauxitic kaolin.

In one aspect, the clay can be a hydrous clay. In another aspect, the clay can be a calcined clay. In one aspect, the calcined clay may contain metakaolin. In yet another aspect, the clay has a moisture content ranging from about 1% by weight or from about 5% by weight to about 15% by weight, e.g., from about 8% by weight to about 12% by weight, or moisture content even higher than 15% by weight. In another aspect, the clay includes a lump clay. In yet another aspect, the clay can include clay that has been at least one of shredded and crushed. In another aspect, the clay can be a non-beneficiated clay. In another aspect, the clay includes a hydrous clay having a BET surface area of at least about 5 m$^2$/g or of at least about 9 m$^2$/g, such as for example at least about 15 m$^2$/g, for example about 3 m$^2$/g to about 200 m$^2$/g or about 5 m$^2$/g to about 150 m$^2$/g. In another aspect, the clay can include a hydrous clay derived from a crude clay having a moisture content of at least about 15%. In another aspect, a slurry may be prepared using blends of the clay and the functional minerals. In another aspect, the composition for use in controlling alkali-rich or silicate-rich deposits in a furnace or boiler comprising: 25-99.9% by weight of a clay; and 0.1-75% by weight of a functional mineral. In another aspect, the composition for use in controlling alkali-rich or silicate-rich deposits in a furnace or boiler comprising: 40-99.9% by weight of a clay; and 0.1-60% by weight of a functional mineral. In another aspect, the composition for use in controlling alkali-rich or silicate-rich deposits in a furnace or boiler comprising: 60-99.9% by weight of a clay; and 0.1-40% by weight of a functional mineral. In another aspect, the composition for use in controlling alkali-rich or silicate-rich deposits in a furnace or boiler comprising: 70-99.9% by weight of a clay; and 0.1-30% by weight of a functional mineral. In another aspect, the composition for use in controlling alkali-rich or silicate-rich deposits in a furnace or boiler comprising: 85-99.9% by weight of a clay; and 0.1-15% by weight of a functional mineral.

Another aspect of the disclosure relates to a method for operating a furnace. The method includes introducing a blend of 5-99.9% by weight of a clay; and 0.1-95% by weight of a functional mineral selected from a magnesium containing mineral, a manganese containing mineral, a titanium dioxide, a zirconium oxide, a bauxitic mineral, a diatomaceous earth, an alumino-silicate mineral or a blend thereof, into the furnace. As used herein, "inorganic compounds-containing materials" and "inorganic compounds" refer to materials containing compounds such as alkalis, alkaline earths, sulfur, chlorine, fluorine, oxides and metals (iron, zinc, antimonium, vanadium, arsenic, cadmium, barium, lead, mercury, nickel, chromium, cobalt, selenium) and/or carbonates and/or hydroxides of an alkali metal and/or alkaline earth metal, and/or salts and/or ions of an alkali metal and/or alkaline earth metal. The hydrous clay has a moisture content of at least about 1% by weight or at least about 5% by weight. The method further includes heating at least a portion of the fuel and hydrous clay, such that at least a portion of the hydrous clay is at least partially calcined and the calcined clay adsorbs at least a portion of alkali present in the furnace. The method further includes removing at least a portion of the at least partially calcined clay and adsorbed alkali from the furnace.

According to yet another aspect, a method for reducing alkali-rich or silicate-rich ash accumulation in a furnace includes introducing a fuel into the furnace and introducing a blend of 5-99.9% by weight of a clay; and 0.1-95% by weight of a functional mineral selected from a magnesium containing mineral, a manganese containing mineral, a titanium dioxide, a zirconium oxide, a bauxitic mineral, a diatomaceous earth, an alumino-silicate mineral or a blend thereof into the furnace, wherein the hydrous clay has a moisture content of at least about 5% by weight. The method further includes heating the fuel and the hydrous clay and the functional mineral, such that at least a portion of the hydrous clay is at least partially calcined and the at least partially calcined clay and functional mineral adsorbs at least a portion of alkali and/or inorganic volatile compounds present in the furnace. The method further includes removing at least a portion of the calcined clay and functional mineral and adsorbed alkali and inorganic volatile compounds from the furnace.

Aside from the structural and procedural arrangements set forth above, the embodiments could include a number of other arrangements, such as those explained hereinafter. It is to be understood that both the foregoing description and the following description are exemplary only.

DESCRIPTION OF EMBODIMENTS

Reference will now be made in detail to a number of exemplary embodiments pertaining to, but not limited to, the first to fourth aspects of the present invention. Fuel may be combusted in a furnace to produce heat, and the heat produced may, in turn, be used to generate electric power, via, for example, a steam generator. Heating the fuel and/or materials (e.g., calcium carbonate) associated with a combustion process may result in release of inorganic components in the furnace, such as alkalis, alkaline earths, sulfur, chlorine, fluorine, oxides and metals (iron, zinc, antimonium, vanadium, arsenic, cadmium, barium, lead, mercury, nickel, chromium, cobalt, selenium).

In accordance with the method of the first aspect of the present invention, a mineral additive blend comprising (i) an aluminosilicate and/or aluminum containing compound and (ii) a functional mineral is introduce into the furnace.

In certain embodiments, the functional mineral comprises or is a magnesium containing mineral. In certain embodiments, the magnesium containing mineral comprises or is magnesium oxide or a magnesium oxide precursor material which forms magnesium oxide upon heating in the furnace. For example, the magnesium oxide precursor material may be selected from one or more of talc, dolomite, brucite and magnesium carbonate. In such embodiments, the heat may at least partially calcine the magnesium oxide precursor, such that the at least partially calcined material is available to act as an adsorbent for at least a portion of the inorganic volatile compounds and contaminants within the furnace. Further, the presence of the at least partially calcined material may serve to increase the refractoriness of fuel ashes generated during the combustion process. Further, the presence of the at least partially calcined material may serve to reduce, suppress or eliminate generation of SOx and/or chlorine gas during the combustion process.

In certain embodiments, the magnesium containing mineral comprises or is talc.

In certain embodiments, the magnesium containing mineral comprises or is magnesium hydroxide, for example, brucite.

In certain embodiments, the magnesium containing mineral, comprises or is dolomite.

In certain embodiments, the magnesium containing mineral comprises or is a mineral selected from magnesium carbonate, hydro-magnesite, vermiculite, smectite, phlogopite, clinochlore, sepiolite, attapulgite or palygorskite.

In certain embodiments, the functional mineral comprises or is a calcium containing mineral.

In certain embodiments, the calcium containing mineral is calcium oxide or a calcium oxide precursor material which forms calcium oxide upon heating in the furnace, for example, calcium carbonate and/or calcium hydroxide. In such embodiments, the heat may at least partially calcine the calcium oxide precursor, such that the at least partially calcined material is available to act as an adsorbent for at least a portion of the inorganic volatile compounds and contaminants within the furnace. Further, the presence of the at least partially calcined material may serve to increase the refractoriness of fuel ashes generated during the combustion process. Further, the presence of the at least partially calcined material may serve to reduce, suppress or eliminate generation of SOx and/or chlorine gas during the combustion process.

In certain embodiments, the calcium containing mineral comprises or is a mineral selected from limestone, marble, chalk, dolomite, aragonitic sand, sea shells, coral, or cement kiln dust, calcareous marl, marl or clayey marl.

In certain embodiments, the calcium containing mineral comprises or is calcium carbonate.

In certain embodiments, the mineral additive blend further comprises a manganese containing mineral or manganese peroxide containing mineral, for example, a manganese containing mineral selected from pyrolusite, braunite, psilomelane, and rhodochrosite, or combinations thereof.

In certain embodiments, the mineral additive blend further comprise one or more of titanium dioxide, for example, a mineral selected from rutile, anatase, ilmenite, leucoxene, and brookite, and zirconium oxide.

In certain embodiments, the mineral additive blend acts to increase the refractoriness of fuel ash generated during combustion, thereby resulting in a more refractory ash that is less likely to be deposited on exposed surfaces of the combustor or its associated heat exchanger, or less likely to form slagging and/or agglomerates.

In certain embodiments, the alumina containing compound comprises or is an aluminum oxide or aluminum hydrate, for example, bauxite, or a mineral selected from gibbsite, nordstrandite, doyleite, bayerite, boehmite, and diaspore, for example, one or more of gibbsite, boehmite, and diaspore.

In certain embodiments, the aluminosilicate is selected from one or more of an aluminosilicate clay, andalusite, kyanite, sillimanite, hydro-topaz, mullite, pyrophyllite, or dombassite.

In certain embodiments, the aluminosilicate clay is selected from one or more of kaolin, halloysite, ball clay, a smectite, bentonite, overburden material from a kaolin, clay or aluminosilicate mining operation, bauxitic kaolin, or calcerous marl or marl or clayey marl.

In certain embodiments, the aluminosilicate comprises or is a bauxitic kaolin, optionally in combination with kaolin and/or bentonite.

In certain embodiments, the bauxitic kaolin is a natural occurring mixture of the aluminum hydrates selected from one or more of gibbsite, nordstrandite, doyleite, bayerite, boehmite and diaspore (for example, one or more of gibbsite, boehmite and diaspore), and kaolinite. The aluminum hydrates may constitute from about 10 to 95% by weight of the mixture and the kaolinite may constitute from about 5 to 90% by weight of the mixture, for example, the aluminum hydrates may constitute from about 20 to 95% by weight of the mixture and the kaolinite may constitute from about 5 to 80% of the mixture, or the aluminum hydrates may constitute from about 30 to 95% by weight of alumina hydrates and may constitute from about 5 to 70% by weight kaolinite, or from about 30 to 70% by weight kaolinite and from about 40-70% by weight alumina hydrates, or form about 40 to 60% by weight kaolinite and from about 40-60% by weight alumina hydrates, or from about 40-50% by weight kaolinite and from about 45-55% by weight alumina hydrates. In certain embodiments, the bauxitic kaolin comprise up to about 5% by weight titanium dioxide, e.g., anatase, for example, up to about 4% by weight titanium dioxide, or up to about 3% by weight titanium dioxide.

In certain embodiments, bauxitic kaolin is prepared by combining, e.g., blending or mixing, kaolin with alumina hydrates, e.g., aluminum trihydrate. The relative amounts of kaolin and alumina hydrate may be selected such that the bauxitic kaolin has a composition as described above relation to the naturally occurring bauxitic kaolin.

In certain embodiments, the mineral additive blend comprises bauxitic kaolin and one or more of magnesium oxide or a magnesium oxide precursor material which forms magnesium oxide upon heating in the furnace and/or calcium oxide or a calcium oxide precursor material which forms calcium oxide upon heating in the furnace. The magnesium oxide precursor material may be selected from dolomite, brucite, magnesium carbonate, and combinations thereof. The calcium oxide precursor may be selected from calcium carbonate, calcium hydroxide, and combination thereof. In such embodiments, the mineral additive blend may further comprise an aluminosilicate clay other than bauxitic kaolin, for example, one or more of kaolin, bentonite or smectite.

In certain embodiments, aluminosilicate comprises or is a aluminosilicate clay material comprising one or both of the minerals kaolinite and smectite in an amount between about 30-100% by weight, based on the total weight of the aluminosilicate clay material. In certain embodiments, the aluminosilicate clay material comprises from about 40-100% by weight of one or more of the minerals kaolinite and smectite, for example, between about 50-90% by weight of one or more of the minerals kaolinite and smectite, or from about 60-80% by weight of one or more of the minerals kaolinite and smectite. In certain embodiments, the aluminosilicate material may comprises from about 12-16 wt. % muscovite, about 3-6 wt. % quartz, and about 1.5 to 5 wt. % rutile, based on the total weight of the aluminosilicate material.

In certain embodiments, the mineral additive blend comprises the aluminosilicate material described immediately above and one or more of magnesium oxide or a magnesium oxide precursor material which forms magnesium oxide upon heating in the furnace and/or calcium oxide or a calcium oxide precursor material which forms calcium oxide upon heating in the furnace. The magnesium oxide precursor material may be selected from dolomite, brucite, magnesium carbonate, and combinations thereof. The calcium oxide precursor may be selected from calcium carbonate, calcium hydroxide, and combination thereof. In such embodiments, the mineral additive blend may further comprise an aluminosilicate clay other than the aluminosilicate material, for example, one or more of kaolin, bauxitic kaolin (as described above), bentonite or smectite.

In certain embodiments, the aluminosilicate comprises or is kaolin, optionally in combination with bauxitic kaolin and/or bentonite.

In certain embodiments, the aluminosilicate comprises or is bentonite, optionally in combination with bauxitic kaolin and/or kaolin.

In certain embodiments, the mineral additive blend comprises kaolin and calcium carbonate, with the proviso that: (i) the kaolin is a hydrous clay having a moisture content ranging from about 1% by weight or from about 5% by weight to about 15% by weight (as described in greater detail below), or (ii) about 20% or about 30% to about 50% or to about 75% of the kaolin clay has a particle size less than about 1 μm (as described in greater detail below), or (iii) the kaolin has a BET surface of at least about 9 m$^2$/g (as described in greater detail below), or (iv) the calcium carbonate comprises less than 50 wt. % of the mineral additive blend. The mineral additive blend may comprise kaolin and calcium carbonate, wherein the blend comprises from about 0.1% to about 99.9% calcium carbonate, for example about 0.1% to about or less than 50% calcium carbonate, for example about 20% or greater than about 20% to less than or about 50% calcium carbonate. In certain embodiments, the mineral additive blend may comprise kaolin and calcium carbonate, with the proviso that: (i) the kaolin is a hydrous clay having a moisture content ranging from about 1% by weight or from about 5% by weight to about 15% by weight, or (ii) about 20% or about 30% to about 50.% or to about 75% of the kaolin clay has a particle size less than about 1 μm, or (iii) the kaolin has a BET surface area of at least about 9 m$^2$/g or about 3 m$^2$/g to about 200 m$^2$/g or about 5 m$^2$/g to about 150 m$^2$/g, or (iv) the blend comprises from about 0.1% to about 99.9% calcium carbonate, for example about 0.1% to about or less than 50% calcium carbonate, for example about 20% or greater than about 20% to about or less than 50% calcium carbonate.

In certain embodiments, the aluminosilicate comprises halloysite.

In certain embodiments, the aluminosilicate comprises a mineral selected from andalusite, kyanite, sillimanite, hydro-topaz, mullite, pyrophyllite, or dombassite.

In certain embodiments, the aluminosilicate comprises a smectite, including montmorillonite and beidellite.

In certain embodiments, the aluminosilicate clay is a hydrous clay, for example, hydrous kaolin.

In certain embodiments, the aluminosilicate clay is a calcined clay. The calcined clay may contain metakaolin.

In certain embodiments, the aluminosilicate clay, for example, kaolin, has a moisture content ranging from about 1% by weight to at least about 50% by weight or to about 70% by weight. According to some embodiments, the aluminosilicate clay may have a moisture content ranging from about 4% by weight to about 16% by weight, for example, from about 8% by weight to about 12% by weight (e.g., about 10% by weight), from about 5% by weight to about 10% by weight, or from about 10% by weight to about 15% by weight. 5% by weight to about 15% by weight, for example, a moisture content ranging from about 8% by weight to about 12% by weight. In certain embodiments, the requisite moisture content may be obtained by partially drying the aluminosilicate clay In certain embodiments, the aluminosilicate clay comprises lump clay, for example, hydrous clay that may be partially dried to a moisture content ranging from at least about 1% by weight to at least about 50% by weight. According to some embodiments, the lump clay may be partially dried to a moisture content ranging from about 4% by weight to about 16% by weight, for example, from about 8% by weight to about 12% by weight (e.g., about 10% by weight), from about 5% by weight to about 10% by weight, or from about 10% by weight to about 15% by weight.

In certain embodiments, the aluminosilicate clay comprises clay that has been at least one of shredded and crushed.

In certain embodiments, the aluminosilicate clay comprises non-beneficiated clay. As used herein, non-beneficiated clay may include clay that has not been subjected to at least one process chosen from dispersion, blunging, selective flocculation, ozone bleaching, classification, magnetic separation, chemical leaching, froth flotation, and dewatering of the clay. In some embodiments, at least a portion of the clay may be kaolin, for example, a hydrous aluminosilicate having a formula, $Al_2Si_2O_5(OH)_4$.

According to some embodiments, in which the mineral additive blend comprises aluminosilicate clay, the heat may at least partially calcine the clay, such that the at least partially calcined clay and functional mineral is available to act as an adsorbent for at least a portion of the alkali and/or inorganic volatile compounds within the furnace. Additionally, the aluminosilicate clay and the functional mineral additive blends may react with ashes increasing its crystallization ability, crystalline fraction and its viscosity, resulting in a more refractory ashes. Consequently, the mineral additive blends renders ashes less sticky and less prone to undergo deposition and densification on the exposed surfaces of the combustor components. According to some embodiments, the different functional minerals composing the functional mineral blends have complementary effects on solving the various combustion problems that can take place in the combustion systems. For example, clays may act as strong adsorption agents for alkali, metal and heavy metal volatile compounds, while magnesium and calcium containing functional minerals act as strong adsorption agents for sulfur, chlorine, fluorine and some metal and heavy metal volatile compounds, such as vanadium compounds. In accordance with some embodiments, bauxitic kaolin-containing minerals may act simultaneously to increase adsorption of alkali, metal and heavy metal compounds and to significantly increase the refractoriness of the fuel ashes. Therefore, the composition of the additive mineral blend may be designed in accordance with a particular combination of fuel and combustion system in order to reduce or even completely eliminate most of the combustion problems simultaneously, such as, slagging, agglomeration, fouling, corrosion and emissions (particulate matter, metals and heavy metal volatiles, SOx, NOx, chlorine). For example, additive mineral blend compositions may be provided in accordance with the present invention to treat simultaneously the different problems caused by fuels having high alkali and sulfur content used at high temperature combustion systems, such as pulverized-fuel combustors. Functional mineral blend compositions may be provided in accordance with the present invention to treat simultaneously the various problems caused by fuels having low sulfur, low ash melting temperature, high alkali, high metal and heavy metal and high chlorine fuels used in relatively high temperature combustion systems, such as grate boilers.

In certain embodiments, the aluminosilicate clay has a BET surface area of from about 3 $m^2/g$ to about 200 $m^2/g$, for example, at least about 9 $m^2/g$, or at least about 15 $m^2/g$, or at least about 20 $m^2/g$, or at least about 30 $m^2/g$, or at least about 40 $m^2/g$, or at least about 50 $m^2/g$, or at least about 75 $m^2/g$, or at least about 100 $m^2/g$, or at least about 125 $m^2/g$, or at least about 150 $m^2/g$, or at least about 175 $m^2/g$. In certain embodiments, the aluminosilicate clay has a BET surface area of from about 3 $m^2/g$ to about 175 $m^2/g$, or from about 5 $m^2/g$ to about 150 $m^2/g$, or from about 9 $m^2/g$ to about 150 $m^2/g$, for example, from about 9 $m^2/g$ to about 125 $m^2/g$, or from about 9 $m^2/g$ to about 100 $m^2/g$.

In certain embodiments, the aluminosilicate clay is derived from a crude clay having a moisture content of at least about 15%.

The aluminosilicate, for example, aluminosilicate clay and/or functional mineral used in the exemplary methods disclosed herein may have a measurable particle size. Particle sizes and other particle size properties referred to herein, such as particle size distribution ("psd"), may be measured using a SEDIGRAPH 5100 instrument as supplied by Micromeritics Corporation. For example, the size of a given particle may be expressed in terms of the diameter of a sphere of equivalent diameter that sediments through the suspension, that is, an equivalent spherical diameter or "esd."

The measurable particle size may indicate the relative coarseness of the aluminosilicate, for example, aluminosilicate clay. In some embodiments, about 10% to about 50% or to about 75% of the aluminosilicate, for example, aluminosilicate clay has a particle size less than about 1 μm. In some embodiments, about 20% to about 40% or to about 50% of the aluminosilicate, for example, aluminosilicate clay has a particle size less than about 1 μm. In some embodiments, for example, embodiments in which the aluminosilicate clay comprises or is the aluminosilicate material described above, about 20% to about 30% of the aluminosilicate material has a particle size less than about 1 μm. In some embodiments, for example, embodiments, in which the aluminosilicate comprises or is bauxitic kaolin, about 30% to about 40% or to about 60% of the bauxitic kaolin has a particle size less than about 1 μm.

In some embodiments, about 5% or about 20% to about 70% or to about 85% of the aluminosilicate, for aluminosilicate clay, has a particle size less than about 2 μm. In some embodiments, about 20% to about 60% of the aluminosilicate, for aluminosilicate clay, has a particle size less than about 2 μm. In some embodiments, about 30% to about 55% of the aluminosilicate, for aluminosilicate clay, has a particle size less than about 2 μm. In some embodiments, about 35% to about 50% of the aluminosilicate, for aluminosilicate clay, has a particle size less than about 2 μm.

In some embodiments, the aluminosilicate, for example, aluminosilicate clay, has a $d_{50}$ of from about 0.5 or from about 1 to about 10 μm or to about 30 μm, for example, from about 0.5 or from about 1 to about 5 μm, or from about 2 to about 5 μm, or from about 2 to about 4 μm. The aluminosilicate, for example, aluminosilicate clay may have a $d_{90}$ of from about 3 or from about 5 to about 30 μm, for example, from about 10 to about 30 μm, for example, from about 10 to about 20 μm, or from about 20 to about 30 μm. The aluminosilicate, for example, aluminosilicate clay, may have a $d_{10}$ of from about 0.1 to about 5 μm or to about 15 μm, for example, from about 0.1 to about 2 μm, or from about 0.5 to about 2 μm, or from about 0.5 to about 1.5 μm.

The aluminosilicate clay used in the exemplary methods disclosed herein may have a measurable washed screen residue, for example, a measurable +325 washed screen retention. For example, the +325 mesh wash screen retention may be from about 0.2% or from about 0.5% to about 20% or to about 9%. In some embodiments, the +325 mesh wash screen retention may be from about 0.5% to about 8%. In some embodiments, the +325 mesh wash screen retention may be from about 0.5% to about 5%. In some embodiments, the +325 mesh wash screen retention may be from about 0.5% to about 1.5%. In some embodiments, the +325 mesh wash screen retention may be from about 4% to about 5%. In some embodiments, the +325 mesh wash screen retention may be from about 1% to about 4.5%. In some embodiments, the +325 mesh wash screen retention may be from about 4.5% to about 9%.

The measurable particle size may indicate the relative coarseness of the functional mineral. In some embodiments, about 50% to about 80% of the functional mineral has a particle size less than about 8 μm. In some embodiments, about 60% to about 80% of the functional mineral has a particle size less than about 8 μm. In some embodiments, about 70% to about 80% of the functional mineral has a particle size less than about 8 μm.

In some embodiments, the functional mineral has a $d_{50}$ of from about 5 to about 40 μm, for example, from about 5 to about 30 μm, or from about 10 to about 30μ, or from about 15 to about 25μ, or from about 10 to about 20 μm. The functional mineral may have a $d_{90}$ of from about 20 to about 70 μm, for example, from about 30 to about 60 μm, or from about 40 to about 60 μm. The functional mineral have a $d_{10}$ of from about 2 to about 10 μm, for example, from about 2 to about 8 μm, or from about 2 to about 6 μm, or from about 3 to about 5 μm.

The functional mineral used in the exemplary methods disclosed herein may have a measurable washed screen residue, for example, a measurable +325 washed screen retention. For example, the +325 mesh wash screen retention may be from about 0.2% or from about 0.5% to about 9% or to about 20%. In some embodiments, the +325 mesh wash screen retention may be from about 0.2% or from about 0.5% to about 8%. In some embodiments, the +325 mesh wash screen retention may be from about 0.2% or from about 0.5% to about 5%. In some embodiments, the +325 mesh wash screen retention may be from about 0.2% or from about 0.5% to about 1.5%. In some embodiments, the +325 mesh wash screen retention may be from about 4% to about 5%. In some embodiments, the +325 mesh wash screen retention may be from about 1% to about 4.5%. In some embodiments, the +325 mesh wash screen retention may be from about 4.5% to about 9% or to about 20%.

In certain embodiments, the functional mineral has a BET surface area of from about 0.5 $m^2/g$ to about 200 $m^2/g$, for example, at least about 1 $m^2/g$, or at least about 5 $m^2/g$, or at least about 10 $m^2/g$, or at least about 30 $m^2/g$, or at least about 50 $m^2/g$. In certain embodiments, the functional mineral has a BET surface area of from about 1 m²/g to about 150 m²/g, or from about 3 m²/g to about 50 m²/g, or from about 5 m²/g to about 30 m²/g, for example, from about 9 m²/g to about 20 m²/g In certain embodiments, said fuel combusts to form an undesirable combustion product and said functional mineral acts as catalyst to convert said undesirable combustion product to a less undesirable compound. In certain embodiments, the undesirable combustion product comprises a nitrogen oxide. In certain embodiments, the undesirable combustion product is carbon monoxide. In certain embodiments, the undesirable combustion product is a nitrogen oxide and carbon monoxide.

In certain embodiments said furnace comprises a pulverized-fuel furnace.

According to some embodiments, combustion may occur in a furnace that is part of a fluidized-bed reactor system for generating electric power via, for example, a steam generator. For example, the furnace may be part of a circulating fluidized-bed reactor system. The furnace may be part of other systems for combusting inorganic compounds-containing materials known to those skilled in the art. In other embodiments, the furnace comprises a grate furnace.

In certain embodiments, the method further comprises combining at least a portion of the fuel and mineral additive blend with one another before introducing the portion of the fuel into the furnace. For example, at least a portion of, or all of, the fuel and the mineral additive blend are pelletized with one another before introduction into the furnace. The fuel and mineral additive blend may be milled together prior to pelletization. Alternatively, the fuel may be milled separately, and then combined with the mineral additive blend (which may also have been milled separately to a predetermined particle size, for example, a particle size as described above). Pelletization may be conducted in accordance with conventional methods known in the art, for example, in accordance with EN 14961-6. A liquid medium, for example, water, may be added prior to or during the pelletization process. The amount of water will generally depend on the amount and type of fuel and the amount and type of mineral additive. The amount of water, if added, will be sufficient to produce a pellet suitable for combustion, for example, a pellet substantially meeting the requirements of EN 14961-6. In certain embodiments, between about 1 and 30% by weight of water, based on the dry weight of fuel and mineral additive blend, may be added, for example, between about 5 and 20% by weight water, or between about 7 and 15% by weight water may be added.

In other embodiments, the fuel and the mineral additive blend are introduced separately into the furnace, for example, in a powdered form, as aggregates or as a slurry.

In certain embodiments in which the mineral additive blend comprises an aluminosilicate clay, the step of heating results in calcining at least a portion of the clay, and the method further comprises: adsorbing at least a portion of inorganic volatile compounds (as described herein) in the furnace via the calcined clay and functional minerals; reacting the calcined clay and functional mineral blend with ash originated from fuel combustion increasing its refractoriness; and removing at least a portion of the calcined clay and adsorbed inorganic compounds from the furnace.

In certain embodiments, the fuel is coal (e.g., lignite), petroleum coke, or biofuel, (e.g., wheat straw, wood pellets, or a mixture of MDF (medium density fibre board)), or a combination of any of the foregoing.

Exemplary coal sources include, without limitation, brown coal, lignite and bituminous coal, such as, for example, eastern bituminous coal, coking coal, Jurassic coal, Triassic coal, Permian coal, and carboniferous coal.

According to some embodiments, the fuel associated with the exemplary methods disclosed herein may include petroleum coke, for example, a carbonaceous solid derived from oil refinery coker and cracking units. In some embodiments, the fuel may include sand of petroleum coke. In some embodiments, the fuel may include combinations of coal and petroleum coke.

According to some exemplary methods disclosed herein, increasing the amount of aluminosilicate clay and functional mineral added to the reactor system may permit a reduction in the amount of coal combusted in the circulating furnace. For example, for about one part by weight of aluminosilicate clay and functional mineral introduced to the system, the amount of coal introduced to the system may be reduced by about 5 parts by weight of coal.

According to some embodiments, the fuel associated with exemplary methods disclosed herein may include biofuel derived from, for example, biomass. Exemplary biomass sources may include, without limitation, wood, wood pellets, straw, straw pellets, wheat straw, wheat straw pellets, peat, lignocellulose, waste biomass and refuse-derived fuels, such as bagasse, wheat stalks, corn stalks, oat stalks, sunflower grain resides, olive residues, rice husks, coconut shells, palm kernels, demolition wood, logging residues, saw dust, and/or energy biomass, such as, for example, grasses of the *Miscanthus* genus.

Additionally, according to some embodiments, the fuel may comprise or include or consist of other refuse-derived fuels or wastes, including, without limitation, municipal and residential waste, industrial wastes, papers, cartons, textiles, tyres, plastics, sewage sludge, black liquor, poultry litter, other animal litter, agricultural wastes in general, and manure, for example, dried manure.

In certain embodiments, the fuel is a sub-bituminous coal or lignite. The sub-bituminous coal may be a PRB coal, a high-alkali PRB coal, or a blend of Illinois and Appalachian coal, for example, a 25/75 wt. % blend of Illinois and Appalachian coal.

Exemplary fuels for use in the methods of the present invention are described in the Examples section below. The fuel properties and compositional characteristics described immediately below may be determined in accordance with the analysis methods described in the Examples section below.

In certain embodiments, the fuel comprises or is a PRB coal having the following characteristics:
  a higher heat value as received from about 10-30 MJ/kg, e.g., from about 15-25 MJ/kg, or from about 18-22 MJ/kg
  a C content (in dry fuel) of from about 60-80 wt. %, e.g., from about 65-75 or 70 wt. %, or from about 68-72 wt. %
  a H content (in dry fuel) of from about 1-10 wt. %, e.g., from about 2-8 wt. %, or from about 3-6 wt. %, or from about 3 or 4-5 wt. %
  a total ash content (in the dry fuel) from about 1-20 wt. %, e.g., from about 2 or 5-15 wt. %, or from about 3 or 7-10 or 12 wt. %, or from about 4 or 8-10 wt. %
  a moisture content of from about 10-50 wt. %, e.g., from about 15 or 20-40 wt. %, or from about 20 or 25-35 wt. %, or from about 23 or 28-32 wt. %

In certain embodiments, the fuel, comprises or is a wheat straw having the following characteristics:

a higher heat value as received from about 9-27 MJ/kg, e.g., from about 13-23 MJ/kg, or from about 14-20 MJ/kg a C content (in dry fuel) of from about 32-55 wt. %, e.g., from about 35-50 wt. %, or from about 38-48 wt. % a H content (in dry fuel) of from about 2-10 wt. %, e.g., from about 2-8 wt. %, or from about 4-7 wt. %, or from about 5-6 wt. % a total ash content (in the dry fuel) from about 1-20 wt. %, e.g., from about 1-10 wt. %, or from about 1.5-8 wt. %, or from about 2-7 wt. % a moisture content of from about 1-50 wt. %, e.g., from about 2-30 wt. %, or from about 5-20 wt. %, or from about 5-10 wt. %

In certain embodiments, the fuel comprises or is a 25% Illinois+75% Appalachian coal (25/75 App) having the following characteristics:

a higher heat value as received from about 10-35 MJ/kg, e.g., from about 15-33 MJ/kg, or from about 23-32 MJ/kg a C content (in dry fuel) of from about 50-85 wt. %, e.g., from about 60-80 wt. %, or from about 67-78 wt. % a H content (in dry fuel) of from about 2-10 wt. %, e.g., from about 2-8 wt. or from about 4-7 wt. %, or from about 4-6 wt. % a total ash content (in the dry fuel) from about 1-20 wt. %, e.g., from about 5-20 wt. %, or from about 10-18 wt. %, or from about 12-17 wt. % a moisture content of from about 1-50 wt. %, e.g., from about 2-30 wt. %, or from about 5-20 wt. %, or from about 5-10 wt. %

In certain embodiments, the fuel comprises or is a wood pellet having the following characteristics:

a higher heat value as received from about 12-25 MJ/kg, e.g., from about 14-23 MJ/kg, or from about 15-20 MJ/kg a C content (in dry fuel) of from about 35-60 wt. %, e.g., from about 40-55 wt. %, or from about 45-54 wt. % a H content (in dry fuel) of from about 2-10 wt. %, e.g., from about 2-8 wt. %, or from about 4-7 wt. %, or from about 4-6 wt. % a total ash content (in the dry fuel) from about 1-20 wt. %, e.g., from about 1-10 wt. %, or from about 1.5-8 wt. %, or from about 2-6 wt. % a moisture content of from about 1-50 wt. %, e.g., from about 2-30 wt. %, or from about 5-20 wt. %, or from about 5-10 wt. %

In certain embodiments, the fuel comprises or is a high alkali PRB coal having the following characteristics:

a higher heat value as received from about 5-20 MJ/kg, e.g., from about 7-15 MJ/kg, or from about 8-14 MJ/kg a C content (in dry fuel) of from about 45-70 wt. %, e.g., from about 50-65 wt. %, or from about 50-60 wt. % a H content (in dry fuel) of from about 2-10 wt. %, e.g., from about 2-8 wt. %, or from about 3-7 wt. %, or from about 3-5 wt. % a total ash content (in the dry fuel) from about 1-20 wt. %, e.g., from about 1-10 wt. %, or from about 3-8 wt. %, or from about 5-8 wt. % a moisture content of from about 1-50 wt. %, e.g., from about 5-40 Wt. %, or from about 10-35 wt. %, or from about 20-35 wt. %

In certain embodiments, the fuel comprises or is a lignite having the following characteristics:

a higher heat value as received from about 1-20 MJ/kg, e.g., from about 1-15 MJ/kg, or from about 2-14 MJ/kg a C content (in dry fuel) of from about 15-70 wt. %, e.g., from about 20-60 wt. %, or from about 30-50 wt. % a H content (in dry fuel) of from about 2-10 wt. %, e.g., from about 2-8 wt. %, or from about 2-7 wt. %, or from about 2-5 wt. % a total ash content (in the dry fuel) from about 10-70 wt. %, e.g., from about 15-60 wt. %, or from about 20-50 wt. %, or from about 25-45 wt. % a moisture content of from about 5-50 wt. %, e.g., from about 10-45 wt. %, or from about 15-45 wt. %, or from about 25-45 wt. %

In certain embodiments, the fuel comprises or is an MDF and waste water sludge (WWS) having the following characteristics:

a higher heat value as received from about 5-25 MJ/kg, e.g., from about 10-20 MJ/kg, or from about 12-18 MJ/kg a C content (in dry fuel) of from about 25-60 wt. %, e.g., from about 40-55 wt. %, or from about 45-55 wt. % a H content (in dry fuel) of from about 2-10 wt. %, e.g., from about 2-8 wt. %, or from about 3-7 wt. %, or from about 4-6 wt. % a total ash content (in the dry fuel) from about 0.5-10 wt. %, e.g., from about 1-6 wt. %, or from about 1.5-5 wt. %, or from about 1.5-4 wt. % a moisture content of from about 5-40 wt. %, e.g., from about 10-35 wt. %, or from about 15-35 wt. %, or from about 20-35 wt.

The fuels described in this document were analysed according to the following methods:

Calorific values: XP CEN/TS 14918 standard method for wheat straw, wood pellets, MDF wood residues, waste water sludge and lignite and ASTM D 5865 for coals.

C and H content: PR NF EN 15104 standard method for wheat straw, wood pellets, MDF wood residues, waste water sludge and lignite and ASTM D 5373 for coals.

Moisture content: XP CEN/TS 14774-1 standard method for wheat straw, wood pellets, MDF wood residues, waste water sludge and lignite and ASTM D 5142 for coals.

Ash content: XP CEN/TS 14775 for ashes at 550° C. and ISO 1171 for ashes at 815° C. standard method for wheat straw, wood pellets, MDF wood residues, waste water sludge and lignite and ASTM D 5142 for coals.

Inorganic and metallic elements: the elemental composition of the fuels wheat straw, wood pellets, MDF wood residues, waste water sludge and lignite were obtained by using ICP-MS after an $HNO_3$ digestion by following the ISO 17294 standard method. The XP CEN/TS 15290 standard method was applied for determining the major elements Al, Ca, Fe, Mg, P, K, Si, Na and the XP CEN/TS 15297 standard method was applied to determine the minor elements (except for lignite whose minor elements were determined by the ISO 1171 standard method). The XP CEN/TS 15289 standard method was applied for determining S and Cl. For the coals PRB, high alkali PRB, Illinois and Appalachian the standard ASTM D 6349 was used for determination of the elemental composition.

In certain embodiments, in which the mineral additive blend comprises an aluminosilicate clay, the clay comprises hydrous clay agglomerates having a size of no more than about 3 inches, for example, hydrous clay agglomerates have a size of no more than about 2 inches or less, or hydrous clay agglomerates have a size of no more than about 1 inch. The requisite size of the agglomerate may be obtained by a physical modification process such as, for example, at least one of milling, hammering, roll crushing, drying, grinding, screening, extruding, triboelectric separating, liquid classifying, and air classifying.

In certain embodiments, the amounts of component (i), component (ii) and mineral additive blend are sufficient to (1) adsorb at least a portion of alkali and/or inorganic volatile compounds present in the furnace, and/or (2) react with fuel ash originated or generated from combustion of the fuel to increase the refractoriness of the fuel ash, and/or (3) to reduce or eliminate SOx emissions.

In certain embodiments, the mineral additive blend is present in the furnace in amount of from about 0.1 to about 20 wt. %, based on the total weight of fuel and mineral additive blend, for example, from about 0.3 or from about 1 to about 10 wt. % or to about 20 wt. %, or from about 0.5 or from about 1 to about 8 or to about 15 wt. %, or from about 0.7 or from about 1 to about 6 or to about 12 wt. %, or from about 1 to about 5 or to about 10 wt. %, or from about 1 or from about 1.5 to about 3 or to about 10 wt. %, or from about 1.5 to about 2.5 or to about 9.5 wt. %. Persons of skill in the will understand that the amount of mineral additive blended added to the furnace may depend on the particular type of fuel being combusted.

In certain embodiments, the mineral blend is present in the furnace in an amount of from about 1 to about 3 wt. %, for example, in embodiments in which the fuel is a PRB coal (as described above).

In certain embodiments, the mineral additive blend is present in the furnace in an amount of from about 2 to about 5 wt. %, for example, in embodiments in which the fuel alkali PRB coal (as described above).

In certain embodiments, the mineral additive blend is present in the furnace in an amount of from about 6 to about 10 wt. %, for example, in embodiments in which the fuel is a 25/75 wet. % Appalachian coal (as described above).

In certain embodiments, the mineral additive blend is present in the furnace in an amount of from about 3 to about 8 wt. %, for example, in embodiments in which the fuel is lignite (as described above).

In certain embodiments, the mineral additive blend is present in the furnace in an amount of from about 1 to about 8 wt. %, for example, in embodiments in which the fuel is wheat straw (as described above).

In certain embodiments, the mineral additive blend is present in the furnace in an amount of from about 0.5 or from about 1.5 to about 4 wt. %, for example, in embodiments in which the fuel is wood pellets (as described above).

In certain embodiments, the mineral additive is blend is present in the furnace in an amount of from about 0.516 about 2 wt. %, for example, in embodiments in which the fuel is a mixture of MDF wood residues and waste water sludge (as described above).

The following table summarizes some exemplary embodiments in terms of the type of fuel and the amount of mineral additive blend addition.

| Fuel | Mineral additive blend addition (wt. %) |
|---|---|
| PRB coal | 1.6-2.3 |
| High Alkali PRB coal | 2.3-3.7 |
| 25% Illinois + 75% Appalachian coal | 7.2-9.1 |
| Lignite | 4.5-5.8 |
| Wheat Straw | 2.25-6.3 |
| Wood pellets | 1.9-2.4 |

-continued

| Fuel | Mineral additive blend addition (wt. %) |
|---|---|
| MDF wood residues + Waste water sludge | 1.0-1.2 |
| General range | 1.0-9.1 |

In certain embodiments, the propensity of slagging and agglomeration, for example, bed agglomeration, is evaluated by analysis of the elemental molar ratio $(Si+K+Na+P):(Ca+Mg+Al)$ in the furnace during combustion. As previously described, Si-, K-, Na- and P-containing species are ash forming species. These species act to stabilize liquid phases formed during combustion and favour the formation of more sticky and easily flowing ashes. The liquid phase forming capability of such species can be tempered by the addition of Ca-, Mg-, and Al-containing species which, upon heating calcine or at least partially calcine to form the corresponding oxide. If the calcium-containing, magnesium-containing and aluminium-containing species are present in a sufficient amount they contribute to crystallize refractory crystalline phases which contribute to decrease ashes stickness and flowability. The present inventors have found that slagging and agglomeration in a combustor may be reduced if the elemental molar ratio $(Si+K+Na+P):(Ca+Mg+Al)$ in the furnace is no greater than about 1.75 or about 1.5. In accordance with the second aspect of the present invention, and in certain embodiments of the first aspect of the present invention, slagging and agglomeration in a combustor may be reduced if the elemental molar ratio $(Si+K+Na+P):(Ca+Mg+Al)$ in the furnace is no greater than about 1.75 or no greater than about 1.5, for example, no greater than about 1.25, or no greater than about 1.2, or no greater than about 1.1, or no greater than about 1.0, or no greater than about 0.95, or no greater than about 0.90, or no greater than about 0.85, or no greater than about 0.80, or no greater than about 0.75, or no greater than about 0.70, or no greater than about 0.65, or no greater than about 0.60, or no greater than about 0.55. In certain embodiments, the elemental molar ratio $(Si+K+Na+P):(Ca+Mg+Al)$ in the furnace is no greater than about 1.25 and is at least about 0.10 or at least about 0.30, for example, at least about 0.20 or at least about 0.30, or at least about 0.45. The amounts of Si, K, Na, P, Ca, Mg and Al can be determined using conventional analytical techniques, including those described herein. Further details are provided in the Examples section below.

In accordance with the third aspect of the present invention, and in certain embodiments, of the first and second aspect of the present invention, the mineral additive blend (for use in controlling alkali-rich and silicate-rich deposits in a furnace or boiler) comprises:

0.1-99.9% by weight of an aluminosilicate and/or aluminum containing compound; and 0.1-99.9% by weight of a functional mineral selected from one or more of a magnesium containing mineral and a calcium containing mineral, based on the total weight of the mineral additive blend.

In certain embodiments, the mineral additive blend comprises:

10-80% kaolin, 5-90% bentonite, 18-85% bauxitic kaolin, 5-85% dolomite, 5-85% brucite, 10-87% calcium carbonate.

In certain embodiments, in case of PRB coal used as fuel, the optimal mineral additive blend comprises: up to 60% kaolin, up to 60% bentonite, 40-70% bauxitic kaolin, 30-60% dolomite, 30-60% brucite, 30-60% calcium carbonate.

In certain embodiments, in case of high alkali PRS coal used as fuel, the optimal mineral additive blend comprises: up to 90% kaolin, 30-90% bentonite, 20-90% bauxitic kaolin, 5-40% dolomite, 5-40% brucite, 5-40% calcium carbonate.

In certain embodiments, in case of 25% Illinois+75% Appalachian coal used as fuel, the optimal mineral additive blend comprises: up to 20% kaolin, up to 20% bentonite, up to 40% bauxitic kaolin, 65-95% dolomite, 65-95% brucite, 65-95% calcium carbonate.

In certain embodiments, in case of lignite used as fuel, the optimal mineral additive blend comprises: 10-60% kaolin, up to 20% bentonite, 20-70% bauxitic kaolin, 30-60% dolomite, 30-60% brucite, 30-60% calcium carbonate.

In certain embodiments, in case of wheat straw used as fuel, the optimal mineral additive blend comprises: up to 90% kaolin, 30-90% bentonite, 30-70% bauxitic kaolin, up to 50% dolomite, up to 50% brucite, up to 50% calcium carbonate.

In certain embodiments, in case of wood pellets used as fuel, the optimal mineral additive blend comprises: up to 50% kaolin, 20-50% bentonite, 20-80% bauxitic kaolin, 20-80% dolomite, 20-80% brucite, 20-80% calcium carbonate.

In certain embodiments, in case of MDF wood residue+ waste water sludge used as fuel, the optimal mineral additive blend comprises: up to 60% kaolin, up to 60% bentonite, 50-90% bauxitic kaolin, 20-90% dolomite, 20-90% brucite, 20-90% calcium carbonate.

In certain embodiments the mineral additive blend comprises or consists essentially of kaolin and bentonite and/or smectite, or kaolin and bauxitic kaolin.

In certain embodiments, the mineral additive blend comprises from about 2-98% by weight of an aluminosilicate and/or aluminum containing compound; and from about 2-98% by weight of a functional mineral selected from one or more of a magnesium containing mineral and a calcium containing mineral, based on the total weight of the mineral additive blend In certain embodiments, the mineral additive blend comprises from about 10-90% by weight of said aluminosilicate and/or aluminum containing compound; and form about 10-90% by weight of said functional mineral selected from one or more of a magnesium containing mineral and a calcium containing mineral.

In certain embodiments, the mineral additive blend comprises at least about 15% by weight of said functional mineral, for example, at least about 20% by weight, or at least about 30% by weight, or at least about 40% by weight, or at least about 50% by weight, or at least about 60% by weight, or at least about 70% by weight, or at least about 80% by weight of said functional material.

In certain embodiments, the mineral additive blend comprises at least about 15% by weight of said aluminosilicate and/or aluminum containing compound, for example, at least about 20% by weight, or at least about 30% by weight, or at least about 40% by weight, or at least about 50% by weight, or at least about 60% by weight, or at least about 70% by weight, or at least about 80% by weight of said aluminosilicate and/or aluminum containing compound.

In certain embodiments, the aluminosilicate and/or aluminum containing compound and the functional mineral are of a type as described above in embodiments of the first aspect of the present invention In certain embodiments, the aluminosilicate and/or aluminum compound is selected from one or more of, or two or more of, or three or more of, or all four of, bauxitic kaolin, kaolin, bentonite and an aluminosilicate material comprising one or both of the minerals kaolinite and smectite in an amount between 30% to 100%, more preferentially between 40% to 100%; and aluminum hydrates selected from one or more of gibbsite, nordstrandite, doyleite, bayerite, boehmite and diaspore in an amount between 0% to 95%, or preferentially between 0% to 60%, based on the total weight of the aluminosilicate material.

In certain embodiments, the functional mineral is selected one or more of, or two or more of, or all three of, dolomite, brucite and calcium carbonate.

In certain embodiments bauxitic kaolin is present in the blend in an amount of, at least about 15 wt. %, based on the total weight of the mineral additive blend, for example, at least about 20 wt. %, or at least about 30 wt. %, or at least about 40 wt. %, or at least about 55 wt. %.

In certain embodiments, the mineral additive blend comprises from about 25-98% by weight of said aluminosilicate and/or aluminum containing compound; and 2-75% by weight of said functional mineral, for example, from about 40-98% by weight of said aluminosilicate and/or aluminum containing compound; and from about 2-60% by weight of said functional mineral, or from about 60-98% by weight of said aluminosilicate and/or aluminum containing compound; and 2-40% by weight of said functional mineral, or from about 70-98% by weight of said clay; and 2-30% by weight of said functional mineral, or from about 85-98% by weight of said aluminosilicate and/or aluminum containing compound; and 2-15% by weight of said functional mineral. In certain embodiments, there may be present about 50% to about 80% by weight of said aluminosilicate and/or aluminium containing compound and/or about 20% or greater than 20% to about 50% or less than 50°/s of a functional mineral (which may be calcium carbonate).

In certain embodiments, there is provided a fuel mixture for a combustor, said fuel mixture comprising from about 0.1-20% by weight of a mineral additive blend as described above with the balance fuel and other optional additives.

The fuel mixture may be provided in the form of a powder.

The fuel mixture may be provided in the form of pellets.

The fuel may be on or more of the fuels described above, for example, one or more of coal, petroleum coke, or biofuel.

In certain embodiments, the fuel of the fuel mixture is a sub-bituminous coal or lignite, for example, a PRB coal, a high-alkali PRB coal, or a blend of Illinois and Appalachian coal, for example, a 25/75 wt. % blend of Illinois and Appalachian coal.

Other exemplary embodiments are described below. In certain embodiments, references to 'clay' includes reference to the aluminosilicate clay described above. In certain embodiments, references to 'functional mineral' includes reference to the magnesium and calcium containing minerals described above.

According to some embodiments, a clay and a functional mineral may be added to the furnace, and the heat may at least partially calcine the clay, such that the at least partially calcined clay and functional mineral is available to act as an adsorbent for at least a portion of the alkali and/or inorganic volatile compounds within the furnace. Additionally, the clay and the functional mineral additive blends may react with ashes increasing its crystallization ability, crystalline fraction and its viscosity, resulting in less flow and more refractory ashes. Consequently, the mineral additive blends renders ashes less sticky and less prone to undergo deposition and densification on the exposed surfaces of the combustor components.

According to some embodiments, a method of operating a furnace may include at least the steps of introducing an alkali-containing material into a furnace, introducing a clay and a functional mineral having a moisture content of at least about 5% (e.g., a moisture content ranging from about 5% by weight to about 15% by weight) into the furnace, and removing at least a portion of the clay (e.g., an at least partially calcined portion of the hydrous clay) from the furnace or its exhaust gas stream.

According to some embodiments, clay may include lump clay, for example, hydrous clay that may be partially dried to a moisture content ranging from at least about 1% by weight to at least about 50% by weight. According to some embodiments, the lump clay may be partially dried to a moisture content ranging from about 4% by weight to about 16% by weight; for example, from about 8% by weight to about 12% by weight (e.g., about 10% by weight), from about 5% by weight to about 10% by weight, or from about 10% by weight to about 15% by weight.

In one embodiment, the lump clay may comprise hydrous clay agglomerates having a size of about 1 inch or less. In other embodiments, the lump clay may comprise hydrous clay agglomerates having a size of about ¾ inch or less, for example, about ½ inch or less. In other embodiments, the lump clay may comprise hydrous clay agglomerates having a size of about ¼ inch or less (e.g., to about ⅛ inch or less). In other embodiments, the lump clay may comprise hydrous clay agglomerates having a maximum lump size of not more than about 3 inches, such as not more than about 2 inches or not more than about 1 inch.

According to some exemplary embodiments, the clay may include one or more of lump clay, clay that has been shredded and/or crushed, non-beneficiated clay, kaolin, ball clay (e.g., clay that includes about 20-80% kaolin, 10%-35% mica, and/or 6%-65% quartz), and clay derived from overburden or process waste from a kaolin or any aluminosilicate mining operation (e.g., clay derived from material located over kaolin deposits being mined). According to some embodiments, the clay may have a BET surface area of at least about 9 $m^2/g$, for example, at least about 10 $m^2/g$ or at least about 15 $m^2/g$.

Inorganic compounds-containing materials according to some embodiments may serve as fuel for combustion. For example, inorganic compounds-containing materials may include one or more of coal, petroleum coke, biofuel (e.g., fuel obtained from biomass) and solid waste. Exemplary coal sources include, without limitation, brown coal, lignite and bituminous coal, such as, for example, eastern bituminous coal, coking coal, Jurassic coal, Triassic coal, Permian coal, and carboniferous coal. In other embodiments, inorganic compounds-containing materials are substantially absent from the fuel used for combustion.

According to some embodiments, inorganic compounds-containing materials may include calcium carbonate. In some embodiments, the calcium carbonate may be provided as particulate limestone, marble, chalk, dolomite, aragonitic sand, sea shells, coral, and/or mixtures thereof. In one embodiment, the inorganic compounds-containing material may include a calcium carbonate originating from a marine originating deposit, for example, wherein the alkali may include residual salt from seawater.

According to some embodiments, fuel and/or inorganic compounds-containing material(s) and clay and a functional mineral may be combined before being supplied to a furnace. For example, fuel and/or inorganic compounds-containing material and clay and a functional mineral may be mixed and/or blended prior to combustion. In some embodiments, at least one of coal and petroleum coke may be mixed and/or blended with the clay and a functional mineral. In other embodiments, calcium carbonate may be mixed and/or blended with the clay and a functional mineral. In yet other embodiments, the clay and a functional mineral may be added directly to a combustor system in the powdered form, as aggregates or as a slurry. For example, the clay and a functional mineral may be added to the furnace or the clay and functional mineral may be added to the bottom ash stream that is gravity fed to the furnace.

According to some embodiments, combustion may occur in a furnace that is part of a fluidized-bed reactor system for generating electric power via, for example, a steam generator. For example, the furnace may be part of a circulating fluidized-bed reactor system. The furnace may be part of other systems for combusting inorganic compounds-containing materials known to those skilled in the art.

In some embodiments, the clay may be at least partially converted to a calcined clay in a furnace. In some embodiments, the at least partially calcined clay may serve to adsorb at least a portion of alkali or inorganic compounds present in the furnace. In some embodiments, the clay may react with ashes increasing its crystallization ability, crystalline fraction and its viscosity, resulting in less flow and more refractory ashes.

Clay and functional mineral may be introduced, in some embodiments, at least twice to a circulating furnace. In some embodiments, at least a portion of the inorganic compounds-containing material may be blended with at least a portion of the clay and functional mineral before the blended inorganic compounds-containing material and clay and functional mineral is introduced into the furnace. According to some embodiments, at least a portion of the clay and functional mineral may be introduced into a lower portion of the furnace. In some embodiments, at least a portion of the clay and functional mineral may be introduced into an upper portion of the furnace. According to some embodiments, at least a portion of the clay and functional mineral may be introduced into an ash-slurry side of a heat exchanger.

Before inorganic compounds-containing material(s) and clay and functional mineral are introduced to the furnace, the size of at least one of the inorganic compounds-containing material and clay and/or functional mineral may, in some embodiments, be subjected to at least one physical modification process. For example, physical modification process(es) may serve to reduce the size of the at least one of the inorganic compounds-containing material and/or clay and/or functional mineral to, for example, about 1 inch or less. In some embodiments, an exemplary physical modification process may reduce the size of at least one of the inorganic compounds-containing material and/or clay and/or functional mineral to about ¾ inch or less, for example, to about ½ inch or less. In some embodiments, the exemplary physical modification process may reduce the size of the at least one of the inorganic compounds-containing material and/or clay and/or functional mineral to about ¼ inch or less (e.g., to about ⅛ inch or less). In other embodiments, the at least one of the inorganic compounds-containing material and/or clay and/or functional mineral may comprise clay and functional mineral agglomerates having a maximum lump size of not more than about 3 inches, such as not more than about 2 inches or not more than about 1 inch. Exemplary physical modification processes may include at least one of milling, hammering, roll crushing, drying, grinding, screening, extruding, triboelectric separating, liquid classifying, and air classifying.

According to some embodiments, inert material may be introduced into the furnace. Exemplary inert materials may include, for example and without limitation, sand, residues of fuel, and/or gypsum. In some embodiments, a fine inert material may be selected to improve separation efficiency in one or more cyclones that may be associated with the furnace system.

The amount of clay and functional mineral introduced into the furnace reactor may be selected based on, for example, an amount sufficient to maintain boiler efficiency. One measure of boiler efficiency relates to boiler steam temperature. In some embodiments, clay and functional mineral may be added in an amount sufficient to maintain a temperature ranging from about 850° C. to about 1200° C. on the hot side of the boiler heat exchanger, for example, in an amount sufficient to maintain a boiler heat exchanger hot side temperature ranging from about 950° C. to about 1010° C. In some embodiments, clay and functional mineral may be added in an amount sufficient to maintain a boiler heat exchanger hot side temperature ranging from about 970° C. to about 1010° C., for example, in an amount sufficient to maintain a boiler heat exchanger hot side temperature ranging from about 1000° C. to about 1010° C. For example, for some furnaces, an amount of clay and functional mineral (e.g., lump semi-dried kaolin) ranging from about 0.1% to 5% by weight of the fuel may be added, for example, an amount ranging from about 1% to about 3% by weight of the fuel may be added.

The clay and functional mineral used in the exemplary methods disclosed herein may have a measurable moisture content. In some embodiments, the clay and functional mineral may have a moisture content of at least about 1% (e.g., at least about 5%). For example, the moisture content of the clay may range from about 5% by weight to about 15% by weight, for example, from about 8% by weight to about 12% by weight. In some embodiments, the clay may have a moisture content ranging from about 9% by weight to about 11% by weight, for example, about 10% by weight (e.g., lump clay having a moisture content of about 10%). In some embodiments, the clay have a moisture content higher than 15% by weight.

The clay and functional mineral used in the exemplary methods disclosed herein may take various forms and/or may have undergone various processes. For example, the clay and functional mineral may include shredded and/or crushed clay. In some embodiments, clay may be non-beneficiated clay. As used herein, non-beneficiated clay may include clay that has not been subjected to at least one process chosen from dispersion, blunging, selective flocculation, ozone bleaching, classification, magnetic separation, chemical leaching, froth flotation, and dewatering of the clay. In some embodiments, at least a portion of the clay may be kaolin, for example, a hydrous aluminosilicate having a formula, $Al_2Si_2O_5(OH)_4$. In some embodiments, the clay may include ball clay. In some embodiments, the clay may include clay derived from overburden or process waste from a kaolin or any aluminosilicate mineral mining operation. In some embodiments, the clay can include bauxitic kaolin. In other embodiments, the clay can include smectitic bentonite. In other embodiments, the clay can include blends of kaolin and/or ball clay and/or bentonite and/or bauxitic kaolin. In some embodiments, the clay can be a hydrous clay. In other embodiments, the clay can be a calcined clay. In some embodiments, the calcined clay may contain metakaolin. In some embodiments, the clay may be clay derived from crude clay having a moisture content of at least about 15%. For example, the clay may include montmorillonitic kaolin.

The clay used in the exemplary methods disclosed herein may be a combination of hydrous clays. For example, at least one hydrous clay may be selected to provide bonding strength to the combination of hydrous clays. In some embodiments, at least one hydrous clay may be selected to increase the coarseness of the hydrous clay combination.

According to some embodiments, the clay used in the exemplary methods disclosed herein may have a measurable BET surface area. For example, the BET surface area may be at least about 9 $m^2/g$, for example, the BET surface area may be at least about 10 $m^2/g$ or at least about 15 $m^2/g$, or at least about 25 $m^2/g$.

The clay and/or functional mineral used in the exemplary methods disclosed herein may have a measurable particle size. Particle sizes and other particle size properties referred to herein, such as particle size distribution ("psd"), may be measured using a SEDIGRAPH 5100 instrument as supplied by Micromeritics Corporation. For example, the size of a given particle may be expressed in terms of the diameter of a sphere of equivalent diameter that sediments through the suspension, that is, an equivalent spherical diameter or "esd."

The measurable particle size may indicate the relative coarseness of the clay. In some embodiments, about 30% to about 50% of the clay has a particle size less than about 1 μm. In some embodiments, about 35% to about 45% of the clay has a particle size less than about 1 μm. In some embodiments, about 30% to about 40% of the clay has a particle size less than about 1 μm. In some embodiments, about 40% to about 50% of the clay has a particle size less than about 1 μm.

In some embodiments, about 60% to about 80% of the clay has a particle size less than about 2 μm. In some embodiments, about 65% to about 75% of the clay has a particle size less than about 2 μm. In some embodiments, about 60% to about 70% of the clay has a particle size less than about 2 μm. In some embodiments, about 70% to about 80% of the clay has a particle size less than about 2 μm.

The clay used in the exemplary methods disclosed herein may have a measurable washed screen residue, for example, a measurable +325 washed screen retention. For example, the +325 mesh wash screen retention may be from about 0.5% to about 9%. In some embodiments, the +325 mesh wash screen retention may be from about 0.5% to about 8%. In some embodiments, the +325 mesh wash screen retention may be from about 0.5% to about 5%. In some embodiments, the +325 mesh wash screen retention may be from about 0.5% to about 1.5%. In some embodiments, the +325 mesh wash screen retention may be from about 4% to about 5%. In some embodiments, the +325 mesh wash screen retention may be from about 1% to about 4.5%. In some embodiments, the +325 mesh wash screen retention may be from about 4.5% to about 9%.

The measurable particle size may indicate the relative coarseness of the functional mineral. In some embodiments, about 30% to about 50% of the functional mineral has a particle size less than about 20 μm, preferably less than about 10 μm. In some embodiments, about 35% to about 45% of the functional mineral has a particle size less than about 20 μm, preferably less than about 10 μm. In some embodiments, about 30% to about 40% of the functional mineral has a particle size less than about 20 μm, preferably less than about 10 μm. In some embodiments, about 40% to about 50% of the functional mineral has a particle size less than about 20 μm, preferably less than about 10 μm. In some embodiments, the functional mineral can range in size from about 1 micron to about 50 microns.

In other embodiments, the functional mineral may be added as coarser particle having a particle size of greater than about 20 µm, such as for example greater than 50 microns, greater than 100 µm, greater than 250 µm, greater than 500 µm, greater than 1 mm, greater than 5 mm, or even greater than 1 cm. In another embodiment, the functional mineral can range in size from about 50 microns to about 1 cm.

In some embodiments, about 60% to about 80% of the functional mineral has a particle size less than about 50 µm, preferably less than about 20 µm. In some embodiments, about 65% to about 75% of the functional mineral has a particle size less than about 50 µm, preferably less than about 20 µm. In some embodiments, about 60% to about 70% of the functional mineral has a particle size less than about 50 µm, preferably less than about 20 µm. In some embodiments, about 70% to about 80% of the functional mineral has a particle size less than about 50 µm, preferably less than about 20 µm.

The functional mineral used in the exemplary methods disclosed herein may have a measurable washed screen residue, for example, a measurable +325 washed screen retention. For example, the +325 mesh wash screen retention may be from about 0.5% to about 9%. In some embodiments, the +325 mesh wash screen retention may be from about 0.5% to about 8%. In some embodiments, the +325 mesh wash screen retention may be from about 0.5% to about 5%. In some embodiments, the +325 mesh wash screen retention may be from about 0.5% to about 1.5%. In some embodiments, the +325 mesh wash screen retention may be from about 4% to about 5%. In some embodiments, the +325 mesh wash screen retention may be from about 1% to about 4.5%. In some embodiments, the +325 mesh wash screen retention may be from about 4.5% to about 9%.

In certain embodiments, the functional mineral has a BET surface area of from about 0.5 $m^2/g$ to about 200 $m^2/g$, for example, at least about 1 $m^2/g$, or at least about 5 $m^2/g$, or at least about 10 $m^2/g$, or at least about 30 $m^2/g$, or at least about 50 $m^2/g$. In certain embodiments, the functional mineral has a BET surface area of from about 1 $m^2/g$ to about 150 $m^2/g$, or from about 3 $m^2/g$ to about 50 $m^2/g$, or from about 5 $m^2/g$ to about 30 $m^2/g$, for example, from about 9 $m^2/g$ to about 20 $m^2/g$.

The exemplary methods disclosed herein may be used in association with a variety of fuel(s) and/or inorganic compounds-containing materials. In some embodiments, the fuel may contain an alkali material.

According to some embodiments, the fuel may include coal. Exemplary coal sources include, without limitation, lignite and bituminous coal, such as, for example, eastern bituminous coal, coking coal, Jurassic coal, Triassic coal, Permian coal, and carboniferous coal.

According to some embodiments, the fuel associated with the exemplary methods disclosed herein may include petroleum coke, for example, a carbonaceous solid derived from oil refinery coker and cracking units. In some embodiments, the fuel may include sand of petroleum coke. In some embodiments, the fuel may include combinations of coal and petroleum coke.

According to some exemplary methods disclosed herein, increasing the amount of clay and functional mineral added to the reactor system may permit a reduction in the amount of coal combusted in the circulating furnace. For example, for about one part by weight of clay and functional mineral introduced to the system, the amount of coal introduced to the system may be reduced by about 5 parts by weight of coal.

According to some embodiments, the fuel associated with exemplary methods disclosed herein may include biofuel derived from, for example, biomass. Exemplary biomass sources may include, without limitation, wood, wood pellets, straw pellets, peat, lignocellulose, waste biomass, such as bagasse, wheat stalks, corn stalks, oat stalks, and/or energy biomass, such as, for example, grasses of the *Miscanthus* genus.

In some embodiments, inorganic compounds-containing materials may include materials selected to reduce at least one of SOx and NOx. For example, the inorganic compounds-containing material(s) selected to reduce at least one of SOx and NOx may include calcium carbonate. For example, calcium carbonate may be derived from the sea. According to some embodiments, the material(s) may include at least one of a SOx- and NOx-getter.

In some embodiments, about 30% to about 50% of the clay has a particle size less than about 1 µm. In some embodiments, about 35% to about 45% of the clay has a particle size less than about 1 µm. In some embodiments, about 30% to about 40% of the clay has a particle size less than about 1 µm. In some embodiments, about 40% to about 50% of the clay has a particle size less than about 1 µm.

In some embodiments, about 60% to about 80% of the clay has a particle size less than about 2 µm. In some embodiments, about 65% to about 75% of the clay has a particle size less than about 2 µm. In some embodiments, about 60% to about 70% of the clay has a particle size less than about 2 µm. In some embodiments, about 70% to about 80% of the clay has a particle size less than about 2 µm. Particle size measurement may be defined by, for example, standard Sedigraph "psd" analytical methods, as previously defined.

In addition to the clay and functional mineral, in some embodiments, the solid material particles may include at least one of a SOx- and NOx-getter and/or an inert material. An exemplary SOx-getter may include, for example and without limitation, calcium carbonate. Exemplary inert materials may include, for example, sand, gypsum, and/or residues of fuel.

For the avoidance of doubt, the present invention includes the subject-Matter as defined in the following numbered paragraphs.

1. A method for operating a combustor, the method comprising:
introducing fuel into a furnace configured to combust the fuel;
introducing a mineral additive blend comprising a clay and a functional mineral into the furnace; and
heating at least a portion of the fuel and mineral blend.

2. The method of paragraph 1, wherein said fuel includes an undesirable contaminant and said functional mineral acts as a sorbent to bind said contaminant.

3. The method of paragraph 2, wherein said contaminant comprises inorganic compounds, such as such as alkalis, alkaline earths, sulfur, chlorine, fluorine, oxides and metals (iron, zinc, antimonium, vanadium, arsenic, cadmium, barium, lead, mercury, nickel, chromium, cobalt).

4. The method of paragraph 2, wherein said contaminant comprises a vanadium compound.

5. The method of paragraph 2, wherein said contaminant comprises a mercury compound.

6. The method of any preceding paragraph, wherein said functional mineral comprises a magnesium containing mineral.

7. The method of paragraph 6, wherein said magnesium containing mineral comprises talc.

8. The method of paragraph 6, wherein said magnesium containing mineral comprises magnesium oxide or hydroxide.

9. The method of paragraph 6, wherein said magnesium containing mineral comprised dolomite.

10. The method of paragraph 6, wherein said magnesium containing mineral comprises a mineral selected from magnesium carbonate, hydro-magnesite, vermiculite, smectite, phlogopite, clinochlore, sepiolite, attapulgite or palygorskite.

11. The method of any of paragraphs 2-5, wherein said functional mineral comprises a calcium containing mineral.

12. The method of paragraph 11, wherein said functional mineral comprises a mineral selected from limestone, marble, chalk, dolomite, aragonitic sand, sea shells, or coral.

13. The method of any of paragraphs 2-5, wherein said functional mineral comprises a manganese containing mineral or manganese peroxide containing mineral.

14. The method of paragraph 13, wherein said manganese containing mineral comprises a mineral selected from pyrolusite, braunite, psilomelane, and rhodochrosite.

15. The method of paragraph 1, wherein said functional mineral acts to increase the refractoriness of said clay, thereby resulting in a more refractory ash that is less likely to be deposited on exposed surfaces of the combustor or its associated heat exchanger.

16. The method of paragraph 15, wherein said functional mineral comprises a metal oxide.

17. The method of paragraph 15, wherein said functional mineral comprises an aluminum oxide or aluminum hydrate.

18. The method of paragraph 15, wherein said functional mineral comprises bauxite.

19. The method of paragraph 15, wherein said functional mineral comprises a mineral selected from gibbsite, boehmite, and diaspore.

20. The method of paragraph 15, wherein said functional mineral comprises a bauxitic kaolin.

21. The method of paragraph 15, wherein said functional mineral comprises titanium oxide.

22. The method of paragraph 15, wherein said functional mineral comprises a mineral selected from rutile, anatase, ilmenite, leucoxene, and brookite.

23. The method of paragraph 15, wherein said functional mineral comprises zirconium oxide.

24. The method of paragraph 15, wherein said functional mineral comprises an aluminosilicate.

25. The method of paragraph 24, wherein said aluminosilicate comprises halloysite.

26. The method of paragraph 24, wherein said aluminosilicate comprises a mineral selected from andalusite, kyanite, sillimanite, hydro-topaz, mullite, pyrophyllite, or dombassite.

27. The method of paragraph 1, wherein said fuel combusts to form an undesirable combustion product and said functional mineral acts as catalyst to convert said undesirable combustion product to a less undesirable compound.

28. The method of paragraph 27, wherein said undesirable combustion product comprises a nitrogen oxide.

29. The method of paragraph 27, wherein said functional mineral comprises titanium oxide.

30. The method of paragraph 27, wherein said functional mineral comprises a mineral selected from rutile, anatase, ilmenite, leucoxene, and brookite.

31. The method of paragraph 1, wherein said functional mineral acts to increase surface area of the clay.

32. The method of paragraph 31, wherein said functional mineral comprises a smectite, including montmorillonite and beidellite.

33. The method of paragraph 31, wherein said functional mineral comprises a mineral selected from bentonite, pyrophyllite, talc, sepiolite and palygorskite.

34. The method of paragraph 31, wherein said functional mineral comprises bauxite.

35. The method of paragraph 31, wherein said functional mineral comprises halloysite.

36. The method of paragraph 31, wherein said functional mineral comprises diatomite.

36. The method of paragraph 1, wherein said functional mineral has a BET surface area of at least about 25 $m^2/g$.

37. The method of paragraph 1, further including the step of introducing calcium carbonate into the furnace.

38. The method of paragraph any preceding paragraph, wherein said furnace comprises a pulverized-fuel furnace.

39. The method of any preceding paragraph, wherein said furnace comprises a grate furnace.

40. The method of paragraph any preceding paragraph, wherein said furnace comprises a circulating fluidized bed.

41. The method of any preceding paragraph, wherein the clay comprises kaolin.

42. The method of any preceding paragraph, wherein the clay comprises ball clay.

43. The method any preceding paragraph, wherein the clay comprises clay derived from overburden or process waste from a kaolin mining operation or any aluminum-silicate mining operation.

44. The method of any preceding paragraph, wherein the clay is a hydrous clay.

45. The method of any preceding paragraph, wherein the clay is a calcined clay.

46. The method of any preceding paragraph, wherein the clay has a moisture content ranging from about 5% by weight to about 15% by weight.

47. The method of any preceding paragraph, wherein the clay has a moisture content ranging from about 8% by weight to about 12% by weight.

48. The method of any preceding paragraph, wherein the clay comprises lump clay.

49. The method of any preceding paragraph, wherein the clay comprises clay that has been at least one of shredded and crushed.

50. The method of any preceding paragraph, wherein the clay comprises non-beneficiated clay.

51. The method of any preceding paragraph, wherein the clay has a BET surface area of at least about 9 $m^2/g$.

52. The method of any preceding paragraph, wherein the clay has a BET surface area of at least about 15 $m^2/g$.

53. The method of any preceding paragraph, wherein the clay is derived from a crude clay having a moisture content of at least about 15%.

54. The method of any preceding paragraph, further comprising combining at least a portion of the fuel, the clay, and the functional mineral with one another before introducing the portion of the fuel into the furnace.

55. The method of any of paragraphs 1-53, in which the fuel, the clay, and the functional mineral are introduced separately into the furnace in the powdered form, as aggregates or as slurry.

56. The method of any preceding paragraph, wherein the step of heating results in calcining at least a portion of the clay, and the method further comprises:

adsorbing at least a portion of inorganic volatile compounds in the furnace via the calcined clay and functional minerals;

reacting the calcined clay and mineral blend with ash originated from fuel combustion increasing its refractoriness; and removing at least a portion of the calcined clay and adsorbed inorganic compounds from the furnace.

57. The method of any preceding paragraph, wherein the fuel is coal, petroleum coke, or biofuel, or a combination of any of the foregoing.

58. The method of any preceding paragraph, wherein the clay comprises hydrous clay agglomerates having a size of no more than about 3 inches.

59. The method of paragraph 58, wherein the hydrous clay agglomerates have a size of no more than about 2 inches or less.

60. The method of paragraph 58, wherein the hydrous clay agglomerates have a size of no more than about 1 inch.

61. Compositions for use in controlling alkali-rich and silicate-rich deposits in a furnace or boiler comprising:
5-99.9% by weight of a clay; and
0.1-95% by weight of a functional mineral selected from a magnesium containing mineral, a manganese containing mineral, a titanium dioxide, a zirconium oxide, a bauxitic mineral, a diatomaceous earth, an alumino-silicate mineral or a blend thereof.

62. The composition of paragraph 61, wherein said functional mineral comprises a magnesium containing mineral.

63. The composition of paragraph 62, wherein said magnesium containing mineral comprises talc.

64. The composition of paragraph 62, wherein said magnesium containing mineral comprises magnesium oxide.

65. The composition of paragraph 62, wherein said magnesium containing mineral comprises magnesium hydroxide.

66. The composition of paragraph 62, wherein said magnesium containing mineral comprises dolomite.

67. The composition of paragraph 62, wherein said magnesium containing mineral comprises a mineral selected from magnesite, hydro-magnesite, vermiculite, smectite, phlogopite, clinochlore, sepiolite, attapulgite or palygorskite.

68. The composition of paragraph 61, wherein said functional mineral comprises a manganese containing mineral.

69. The composition of paragraph 68, wherein said manganese containing mineral comprises a mineral selected from pyrolusite, braunite, psilomelane, and rhodochrosite.

70. The composition of paragraph 61, wherein said functional mineral comprises an aluminum oxide.

71. The composition of paragraph 70, wherein said functional mineral comprises bauxite.

72. The composition of paragraph 70, wherein said functional mineral comprises a mineral selected from gibbsite, boehmite, and diaspore.

73. The composition of paragraph 70, wherein said functional mineral comprises a bauxitic kaolin.

74. The composition of paragraph 61, wherein said functional mineral comprises aluminosilicate minerals.

75. The composition of paragraph 74, wherein said functional mineral comprises a mineral selected from andalusite, kyanite, sillimanite, hydro-topaz, mullite, pyrophyllite, or dombassite.

76. The composition of paragraph 61, wherein said functional mineral comprises titanium oxide.

77. The composition of paragraph 76, wherein said functional mineral comprises a mineral selected from rutile, anatase, ilmenite, leucoxene, and brookite.

78. The composition of paragraph 61, wherein said functional mineral comprises zirconium oxide.

79. The composition of paragraph 61, wherein the clay comprises kaolin.

80. The composition of paragraph 61, wherein the clay comprises ball clay.

81. The composition of paragraph 61, wherein the clay comprises clay derived from overburden or process waste from a kaolin or any aluminosilicate mining operation.

82. The composition of paragraph 61, wherein the clay is a hydrous clay.

83. The composition of paragraph 61, wherein the clay is a calcined clay.

84. The composition of paragraph 61, wherein the clay has a moisture content ranging from about 5% by weight to about 15% by weight:

85. The composition of paragraph 61, wherein the clay has a moisture content ranging from about 8% by weight to about 12% by weight.

86. The composition of paragraph 61, wherein the clay comprises lump clay.

87. The composition of paragraph 61, wherein the clay comprises clay that has been at least one of shredded and crushed.

88. The composition of paragraph 61, wherein the clay comprises non-beneficiated clay.

89. The composition of paragraph 61, wherein the hydrous clay has a BET surface area of at least about 9 $m^2/g$.

90. The composition of paragraph 61, wherein the hydrous clay has a BET surface area of at least about 15 $m^2/g$.

91. The composition of paragraph 61, wherein hydrous clay comprises clay derived from crude clay having a moisture content of at least about 15%.

92. The composition of paragraph 61, comprising 25-99.9% by weight of said clay; and 0.1-75% by weight of said functional mineral.

93. The composition of paragraph 61, comprising 40-99.9% by weight of said clay; and 0.1-60% by weight of said functional mineral.

94. The composition of paragraph 61, comprising 60-99.9% by weight of said clay; and 0.1-40% by weight of said functional mineral.

95. The composition of paragraph 61, comprising 70-99.9% by weight of said clay; and 0.1-30% by weight of said functional mineral.

96. The composition of paragraph 61, comprising 85-99.9% by weight of said clay; and 0.1-15% by weight of said functional mineral.

EXAMPLES

Other embodiments of the disclosure will be apparent to those skilled in the art from consideration of the specification and practice of the exemplary embodiments disclosed herein. It is intended that the specification and examples be considered as exemplary only, with a true scope and spirit of the disclosure being indicated by the appended claims.

A straw was burned alone or with different additives based on minerals blends. Each additive solution was tested in a pelletized form in a pilot-scale grate burner.

Experimental Apparatus

The combustion was carried out in a 25 kW"HS Multi Heat" scale grate boiler at about 1040° C. (+1-40° C.). This boiler was not equipped with an automatic ash-removal system and the primary and secondary air injection inlets were close enough to maintain a high temperature, so that the bottom ashes production was favoured. The air injection was set up so that λ=2 and $O_2$=10% during the combustion. For each example test, the pellets were introduced via a metered-screw into the combustion chamber at a feeding-rate of 5 kg/h and the combustion lasted 5 hours 30 mins (4 hours at permanent regime).

Monitoring Combustion

During combustion, the parameters listed below were monitored to evaluate the combustion efficiency, emissions of particles and the composition of gases.

The Combustion. Recovery (%) and the energy released (kW measured by using a calorie-meter coupled with a pt100 probe and a flow-meter) were measured. For each example test, by knowing the mass of pellets which were burnt, it was possible to calculate the low calorific value of the pellet and, by comparing it with the theoretical one, to estimate the efficiency of the combustion (%).

Isokinetic pumping of the dust and gases was performed by following the instructions given in the NF X 44-052 standard document. Measurements were taken over the 4 hours of the permanent regime.

The Total Dust Content in the exhaust gas was measured, without any sizing, by following the NE X 44-052 standard procedure.

CO and NO, emissions were measured using an electrochemical cell for the exhaust gases. The values are given in ppm under normalised conditions at 11% $O_2$ and 9.5% $CO_2$.

The weight of $H_2S$ emitted was measured for the exhaust gas following capture by an isokinetic pumping system which had directed it into a NaOH bubbling absorption solution. The analysis was done by following the NF EN 1911 standard document.

The amount of heavy metals, such as Cd and Pb, was measured in both the particles after filtration of the exhaust gas and in the gas itself after following capture by an isokinetic pumping system which had directed it into a $HNO_3+H_2O_2$ bubbling absorption solution. Then the measurements were made by following the NF EN 14385 standard procedure.

The amount of Hg was measured by using the same protocol except that the bubbling absorption solution consisted of $HNO_3$+K-dichromate. The measurements were made by following the NF EN 13211 standard procedure.

Details of the Biomass Fuel, Mineral Additives and Pellets

The fuel was a straw which was harvested in the Paris-basin area. The straw has characteristically high chlorine and potassium contents. Its moisture content was obtained using the XP CEN/TS 14774 standard method and was equal to 8.8 wt % (as received). Its ash content was obtained using the XP CEN/TS 14775 standard method and was equal to 6.1 wt % (dry basis). Its calorific values were obtained using the XP CEN/TS 14918 standard method and were: High Calorific Value for dry: 18,525 MJ/kg, Low Calorific Value for dry: 17,370 MJ/kg, High Calorific Value for as-received: 16,895 MJ/kg and Low Calorific Value for as-received: 35,638 MJ/kg. Inorganic and metallic elements were measured after an $HNO_3$ digestion of the straw by following the ISO 17294 standard method. The elemental composition was obtained by using ICP-MS and by following the XP CEN/TS 15290 standard method for Al, Ca, Fe, Mg, P, K, Si, Na, and by following the XP CEN/TS 15297 standard method for As, Cr, Cd, Cu, Ni, Zn, Pb, and by following the XP CEN/TS 15289 standard method for S and Cl. The results, given in mg·kg$^{-1}$ are as follows: Na 47.65, Mg 792.23, Al 33.78, P 563.1, K 9228.13, Ca 3630.24, Si 104.31, Fe 85.65, As <0.1, Cr 0.56, Cd 0.10, Cu 1.57, Ni <0.5, Zn 4.76, Pb <0.5, Hg <0.05, Ti 0.75, Cl 2400. C, H, and N content were analysed by following the NF EN 15104 standard, whereas S was analysed by following the NF EN 15289. They were found to be (in %, dry basis) equal to C 41.6, H 5.61, N 0.77, and S 0.11.

Examples 1-8

Eight example tests were carried out on the compositions described in Table 1. Comparative. Example 1 (hereafter Example 1) was carried out using the straw alone. For Examples 2 to 8, 2.25 wt % of additive as described was combined with 97.75 wt % of straw. 1.8 wt % corresponds to 80% of the additive portion, 0.9 wt % corresponded to 40% of the additive portion and 0.45 wt % accounted for 20% of the additive portion.

Prior to beginning the example tests, each additive was analysed. Chemical analysis was carried out by using a S4 explorer X-Ray fluorescence device from Bruker, a technique that involves forming a fused translucent button of pre-dried sample material, at a temperature of 1200° C. The results of these analyses are shown in Table 2. The Loss on Ignition (LOI), also shown in Table 2, was measured by putting the sample at 1050° C. overnight.

Values for C and S content (shown in Table 3) were obtained by using a LECO C, S analyser. Particle Size Distribution was measured by using a Sedigraph from Micromeritics.

Specific Surface Area (SSA), shown in Table 4, was assessed by using a BET from Micromeritics.

Quantitative mineralogical compositions (shown in Table 5) were obtained by using the Topas software on the X-Ray Diffraction spectra obtained by using a D8 device from Bruker.

TABLE 1

Composition of the pellets

| wt % | Ex. 1 | Ex. 2 | Ex. 3 | Ex. 4 | Ex. 5 | Ex. 6 | Ex. 7 | Ex. 8 |
|---|---|---|---|---|---|---|---|---|
| Straw | 100 | 97.75 | 97.75 | 97.75 | 97.75 | 97.75 | 97.75 | 97.75 |
| Kaolin |  | 2.25 |  |  | 1.8 |  | 0.9 |  |
| Bauxitic Kaolin |  |  | 2.25 |  |  |  |  | 0.9 |
| Dolomite |  |  |  | 2.25 | 0.45 | 0.45 | 0.45 | 0.45 |
| Bentonite |  |  |  |  |  | 1.8 | 0.9 | 0.9 |

TABLE 2

Chemical composition of mineral additives obtained by S4 Explorer XR

| wt % | $SiO_2$ | $Al_2O_3$ | $Fe_2O_3$ | $TiO_2$ | CaO | MgO | $Na_2O$ | $K_2O$ | LOI |
|---|---|---|---|---|---|---|---|---|---|
| Kaolin | 47.8 | 36.5 | 1.3 | 0.1 | 0.1 | 0.3 | 0.1 | 2.4 | 11.8 |
| Bauxitic Kaolin | 20.8 | 52.5 | 1 | 2.6 | 0.1 | 0 | 0 | 0.1 | 23.8 |
| Dolomite | 1 | 0.2 | 0.1 | 0 | 36.6 | 16.5 | 0 | 0 | 45.7 |
| Bentonite | 49.1 | 16.8 | 4.6 | 0.7 | 5.7 | 3.7 | 2.9 | 0.5 | 10.3 |

TABLE 3

C and S content in mineral additives as obtained by using a LECO

| ppm | C | S |
|---|---|---|
| Kaolin | 635 | 67 |
| Bauxitic Kaolin | 1868 | 2819 |
| Dolomite | 120580 | 10 |
| Bentonite | 14100 | 11130 |

TABLE 4

$d_{10}$, $d_{50}$ and $d_{90}$ values, wt % for different grain-sizes and SSA of mineral additives

| | $d_{10}$ μm | $d_{50}$ μm | $d_{90}$ μm | >8 μm | >5 μm | <2 μm | <1 μm | SSA (m²/g) |
|---|---|---|---|---|---|---|---|---|
| Kaolin | 1 | 3 | 13 | 22 | 38 | 37 | 24 | 10 |
| Bauxitic Kaolin | 1 | 3 | 24 | 30 | 39 | 46 | 33 | 101 |
| Dolomite | 4 | 14 | 48 | 73 | 86 | 4 | 2 | 1 |
| Bentonite | 1 | 4 | 16 | 27 | 42 | 24 | 4 | 48 |
| Kaolin + Dolomite | | | | | | | | 8 |
| Bentonite + Dolomite | | | | | | | | 38 |
| Kaolin + Bentonite + Dolomite | | | | | | | | 22 |
| Bauxitic | | | | | | | | 53 |
| Kaolin + Bentonite + Dolomite | | | | | | | | |

TABLE 5

Quantitative mineralogical analysis of mineral additives

| wt % | Kaolin | Bauxitic Kaolin | Dolomite | Bentonite |
|---|---|---|---|---|
| Kaolinite | 79 | 44 | | |
| Muscovite | 14 | | | |
| Beidellite | | | | 67 |
| Quartz | 4.5 | | <1 | 4 |
| Gibbsite | | 49 | | |
| Boehmite | | 4 | | |
| Calcite | | | 20 | 8 |
| Dolomite | | | 79 | 11 |
| Anatase | | 3 | | 2 |
| Rutile | 2.5 | | | |
| Gypsum | | | | |
| Barite | | | | 6 |
| Pyrite | | | | 1 |

Details of the Pelletization Process

The straw was milled using a pilot-scale hammer mill operated at 2400 rpm and equipped with a 3 mm grid. The mineral additives were added to the milled straw to produce pellets.

The optimum pelletization parameters (compression rate=7 and water addition=12%) were determined when working on the straw alone in order to obtain pellets having the closest characteristics to the ones described in the EN 14961-6. The compression rate was kept constant whereas water addition was fine-tuned for each mineral blend. During the pelletization, the power of the press system, the production rate and the temperature of the extrusion part were measured.

Details of the Pellets' Physical Properties

The pellets were then quantified by taking the following measurements: durability, hardness, volumetric mass and moisture content, as reported in Table 6.

TABLE 6

Physical properties of the pellets

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Volumetric weight (kg/m³) | 600 | 599 | 601 | 599 | 589 | 599 | 603 | 602 |
| Durability (%) | 95 | 94 | 94 | 95 | 94 | 94 | 95 | 95 |
| Hardness (kp) | 20 | 17 | 16 | 19 | 19 | 17.5 | 19 | 20 |

The data indicate that all the pellets are comparable in term of physical properties.

Characterization of the Combustion Residues

For each example, at the end of the combustion, the bottom ashes, deposit ashes (vertically above the firing zone on the horizontal heat exchanger) and fume ashes (at the back of the horizontal heat exchanger, where the exhaust pipeline starts) were collected and weighted. The bottom ashes were sieved at 8 and 3.15 mm and the subsequent fractions weighed. The total ash content was calculated and given as a % of the as-received material.

The >8 mm bottom ashes underwent a shaking test in order to estimate their friability. For this purpose, a number of bottom ashes, being calibrated between 31 to 8 mm in diameter, were selected so that they were representative of the different aspects (melted, crumbly, etc). Their number was defined so that they filled one third of a 9.5 cm inch diameter and 1 L in volume PE-container. The >8 mm ashes were shaken during 15 minutes in a Turbula device from WAB. The resulting ashes were sieved during 5 minutes on a Analysette 3 sieving system from Fritsch equipped with the following sieves: 8 mm, 5 mm, 2.5 mm, 1 mm, 630 μm. The set-up was chosen so that the amplitude was 0.2 mm and 1 s of stand-by was assured every 30 s. A friability index is computed with the following formula:

$$\frac{Findex > 8 \text{ mm} + Findex < 630 \text{ μm}}{2}$$

Where $Findex > 8 \text{ mm} = (100 - \text{wt \%} > 8 \text{ mm})/10$ and $Findex < 630 \text{ μm} = \text{wt \%} < 630 \text{ μm}/10$.

Friability index (Findex) varies from 1 to 10 and the highest value corresponds to the highest friability.

Effect on Combustion Recovery and Efficiency

Combustion recovery and efficiency results are shown in Table 7.

TABLE 7

Combustion recovery and efficiency

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Combustion Recovery (% under permanent regime): | | | | | | | | |
| Combustion Recovery | 89.6 | 90.2 | 89.75 | 90 | 89.85 | 89.9 | 90.45 | 89.8 |
| Energetic balance (kWh/kg on as received sample): | | | | | | | | |
| Low Calorific Power | 3.624 | 3.589 | 3.546 | 3.655 | 3.611 | 3.577 | 3.652 | 3.042 |
| PCI if 100% efficiency | 4.34 | 4.242 | 4.242 | 4.242 | 4.242 | 4.242 | 4.242 | 4.242 |
| % efficiency | 84 | 85 | 84 | 86 | 85 | 84 | 86 | 72 |
| % Variation/Example 1 |  | 1 | 0 | 3 | 2 | 1 | 3 | −14 |

Effects on Emissions

A comparison of the analyses indicated a significant reduction in the dust emissions owing to the additives, as shown in Table 8. For all the test examples, the dust emissions are below the French Emission Limit, which equals 150 mg/m$^3$.

TABLE 8

Dust emissions monitored during the example tests

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Dust (mg/m$^3$) | 47.2 | 37.5 | 32.6 | 37.2 | 25.3 | 35.8 | 33.4 | 32.5 |
| % Variation/Ex. 1 |  | −21 | −31 | −21 | −46 | −24 | −29 | −31 |
| Theoretical variation if linear |  |  |  | −21 |  | −35 |  |  |

A comparison of the analyses indicated a significant reduction in the undesirable components in the gases thanks to the additives as shown in the Table 9.

TABLE 9

Gas emissions monitored during the example tests

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Emissions (ppm normalized for 11% O$_2$ and 9.5% CO$_2$): | | | | | | | | |
| CO | 132 | 28 | 43 | 20 | 39 | 75 | 49 | 16 |
| % Variation/Ex. 1 |  | −79 | −67 | −85 | −70 | −43 | −63 | −88 |
| Theoretical variation if linear |  |  |  | −80 |  | −57 |  |  |
| NOx | 235 | 270 | 254 | 258 | 267 | 232 | 219 | 264 |
| % Variation/Ex. 1 |  | 15 | 8 | 10 | 14 | −1 | −7 | 12 |
| Theoretical variation if linear |  |  |  | 14 |  | 6 |  |  |

Regarding H$_2$S emission, for all the example tests the value is far below the French Limit Value, which equals 5 mg/m$^3$, as shown in the Table 10.

TABLE 10

H$_2$S emission monitered during the example tests

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| H$_2$S (mg/m$^3$) | <0.01 | <0.02 | <0.02 | <0.02 | <0.03 | 0.02 | <0.02 | <0.03 |

Heavy metals emissions data is presented in Table 11.

TABLE 11

Total (gas + particulates) heavy metals emission monitored during the example tests

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Hg (mg/m$^3$) | <0.0011 | <0.0011 | <0.0011 | <0.0023 | <0.0012 | 0.0011 | <0.0011 | <0.0023 |
| Cd (mg/m$^3$) | 0.002 | 0.002 | 0.001 | 0.002 | 0.001 | 0.002 | 0.002 | 0.001 |
| Pb (mg/m$^3$) | 0.03 | 0.01 | 0.009 | 0.004 | 0.008 | 0.012 | 0.009 | 0.009 |

Ash Characteristics

Ash analysis data are shown in Table 12.

TABLE 12

Total Ash Content

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Theoretical ash content (wt % on as received): | | | | | | | | |
| Ash content | 5.49 | 7.15 | 6.91 | 6.47 | 7.02 | 7.04 | 7.03 | 6.93 |
| Total ashes (wt % on as received): | | | | | | | | |
| Total ash content | 4.86 | 6.18 | 6.23 | 5.94 | 6.52 | 6.46 | 6.55 | 6.15 |

Table 13 indicates the ash repartition.

The positive effect of minerals on the ash characteristics is assessed by taking into account the following criteria: wt % of bottom ashes >8 mm, which should be the lowest possible to favour the combustion (wt % of bottom ashes <3.15 mm being the highest possible) and the friability index, from 1 to 10, which should be the highest possible to favour the cleaning of the combustion zone and the removal of the ashes.

TABLE 13

Ash repartition and friability index of the >8 mm bottom ashes

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Ash distribution (% of total ash): | | | | | | | | |
| Bottom ash >8 mm | 71 | 35 | 24 | 66 | 30 | 60 | 45 | 43 |
| % Variation/Ex. 1 |  | −50 | −66 | −7 | −57 | −14 | −36 | −39 |
| Theoretical variation if linear |  |  |  |  | −41 |  | −36 |  |
| Bottom ash 3.15-8 mm | 9 | 23 | 17 | 11 | 18 | 12 | 20 | 21 |
| % Variation/Ex. 1 |  | 156 | 90 | 16 | 96 | 27 | 117 | 126 |
| Theoretical variation if linear |  |  |  |  | 128 |  | 61 |  |
| Bottom ash >3.15 mm | 19 | 39 | 57 | 22 | 50 | 26 | 33 | 36 |
| % Variation/Ex. 1 |  | 111 | 208 | 20 | 170 | 41 | 76 | 91 |
| Theoretical variation if linear |  |  |  |  | 93 |  | 105 |  |
| Fly ash (D = deposit) | 1.1 | 1.0 | 0.8 | 1.3 | 1.1 | 1.2 | 1.4 | 1.0 |
| % Variation/Ex. 1 |  | −14 | −26 | 11 | 0 | 5 | 27 | −11 |
| Theoretical variation if linear |  |  |  |  | −9 |  | 3 |  |
| Fly ash (F = fume) | 0.6 | 1.2 | 0.2 | 0.1 | 0.4 | 0.7 | 0.6 | 0.1 |
| % Variation/Ex. 1 |  | 125 | −67 | −80 | −25 | 18 | 15 | −76 |
| Theoretical variation if linear |  |  |  |  | 84 |  | −4 |  |
| Friability index (from 1 to 10): | | | | | | | | |
| Friability index | 2 | 5 | 7 | 1 | 6 | 2 | 3 | 3 |
| % Variation/Ex. 1 |  | 112 | 223 | −35 | 157 | −18 | 31 | 29 |
| Theoretical variation if linear |  |  |  |  | 82 |  | 69 |  |

The invention claimed is:

1. A method for operating a combustor, the method comprising:
    introducing a fuel into a furnace, wherein the fuel comprises potassium and phosphorous and the material in the furnace has a first elemental molar ratio (Si+K+Na+P):(Ca+Mg+Al);
    introducing a mineral additive blend into the furnace in an amount sufficient to sufficient to reduce the first elemental molar ratio (Si+K+Na+P):(Ca+Mg+Al) of the material in the furnace to a second elemental molar ratio, and
    heating at least a portion of the fuel and the mineral additive blend,
    wherein the mineral additive blend comprises
        (i) about 70% to 98% by weight of an aluminosilicate selected from kaolin, bauxitic kaolin, ball clay and blends thereof, and
        (ii) about 2% to 30% by weight of a functional mineral comprising magnesium selected from of talc, dolomite, brucite and magnesium carbonate; and
    wherein the second elemental molar ratio is at least 0.10 and less than 1.25.

2. The method of claim 1, wherein the functional mineral comprising magnesium comprises dolomite.

3. The method of claim 1, wherein the aluminosilicate comprises a calcined clay.

4. The method of claim 1, wherein the aluminosilicate comprises nonbeneficiated clay.

5. The method of claim 1, wherein the aluminosilicate has a BET surface area of at least 9 $m^2/g$.

6. The method of claim 1, wherein the mineral additive blend is present in the furnace in amount ranging from 1 to 20 wt. %, based on the total weight of fuel and mineral additive blend.

7. The method of claim 1, wherein the heating generates fuel ash, and the mineral additive blend increases a refractoriness of the fuel ash as compared to fuel ash generated in absence of the mineral additive blend.

8. The method of claim 1, wherein at least a portion of the fuel and the mineral additive blend are pelletized with one another before introduction into the furnace.

9. The method of claim 1, wherein the fuel further comprises chlorine, vanadium, or a combination thereof.

10. The method of claim 1, wherein the mineral additive blend comprises kaolin, wherein the kaolin is a hydrous clay having a moisture content ranging from about 5% by weight to about 15% by weight.

11. The method of claim 10, wherein about 30% to about 50% of the kaolin has a particle size less than 1 μm.

\* \* \* \* \*